(12) United States Patent
Fripp et al.

(10) Patent No.: US 12,404,745 B1
(45) Date of Patent: Sep. 2, 2025

(54) AUTONOMOUS INJECTION FLOW CONTROL VALVE

(71) Applicant: Halliburton Energy Services, Inc., Houston, TX (US)

(72) Inventors: Michael Linley Fripp, Singapore (SG); Fraser Murray, Singapore (SG); Mohan Gunasekaran, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/591,783

(22) Filed: Feb. 29, 2024

(51) Int. Cl.
  *E21B 34/10* (2006.01)
  *E21B 41/00* (2006.01)
  *F16K 5/06* (2006.01)

(52) U.S. Cl.
  CPC .......... *E21B 34/10* (2013.01); *E21B 41/0064* (2013.01); *F16K 5/0647* (2013.01)

(58) Field of Classification Search
  CPC ..... E21B 34/10; E21B 41/0064; F16K 5/0647
  See application file for complete search history.

(56) References Cited

U.S. PATENT DOCUMENTS

| | | | |
|---|---|---|---|
| 4,577,692 A | 3/1986 | Reardon | |
| 6,745,834 B2 | 6/2004 | Davis et al. | |
| 7,866,400 B2 | 1/2011 | Steele et al. | |
| 9,534,701 B2 | 1/2017 | Gano et al. | |
| 10,119,362 B2 | 11/2018 | Fripp et al. | |
| 2007/0284118 A1* | 12/2007 | Benton | E21B 23/0415 166/334.4 |
| 2009/0308607 A1 | 12/2009 | Anyan | |
| 2012/0018172 A1 | 1/2012 | Javed | |
| 2017/0234106 A1* | 8/2017 | Mathiesen | E21B 34/08 166/53 |
| 2022/0333460 A1 | 10/2022 | Fripp et al. | |

FOREIGN PATENT DOCUMENTS

CN 108086946 A 5/2018

* cited by examiner

*Primary Examiner* — Dany E Akakpo
(74) *Attorney, Agent, or Firm* — Scott Richardson; Parker Justiss, P.C.

(57) ABSTRACT

Provided is a flow control valve, a well system, and a method. The flow control valve, in one aspect, includes a tubular configured to be positioned downhole in a wellbore, the tubular having a central longitudinal axis, and a piston located in the tubular, the piston configured to separate injection fluid located within the tubular from a working fluid located in a sealed working fluid chamber. The flow control valve, according to this aspect, further includes a valve assembly located within the tubular and coupled with the piston, wherein the piston is configured to axially slide within the tubular to move the valve assembly between an open position that provides a fluid passageway for the injection fluid from the tubular into a subterranean formation and a closed position that closes the fluid passageway for the injection fluid from the tubular into the subterranean formation, based upon a density of the injection fluid.

21 Claims, 21 Drawing Sheets

AUTONOMOUS INJECTION FLOW CONTROL VALVE

BACKGROUND

Various subterranean reservoirs, such as wellbores, wellbore networks, and underground spaces such as rock formation material or a subterranean cavity, may be used to store various types of liquids and gases. For example, some subterranean reservoirs may be used for carbon dioxide ($CO_2$) sequestration, which for example may be utilized to secure a space for permanent disposal of $CO_2$ based on meeting various environmental/governmental regulations regarding the handling of $CO_2$. In other examples, a reusable resource, such as hydrogen, may be stored on a temporary basis in a subterranean reservoir, and recovered at a later time for use as needed.

BRIEF DESCRIPTION

Reference is now made to the following descriptions taken in conjunction with the accompanying drawings, in which.

DETAILED DESCRIPTION

Figure 1A:
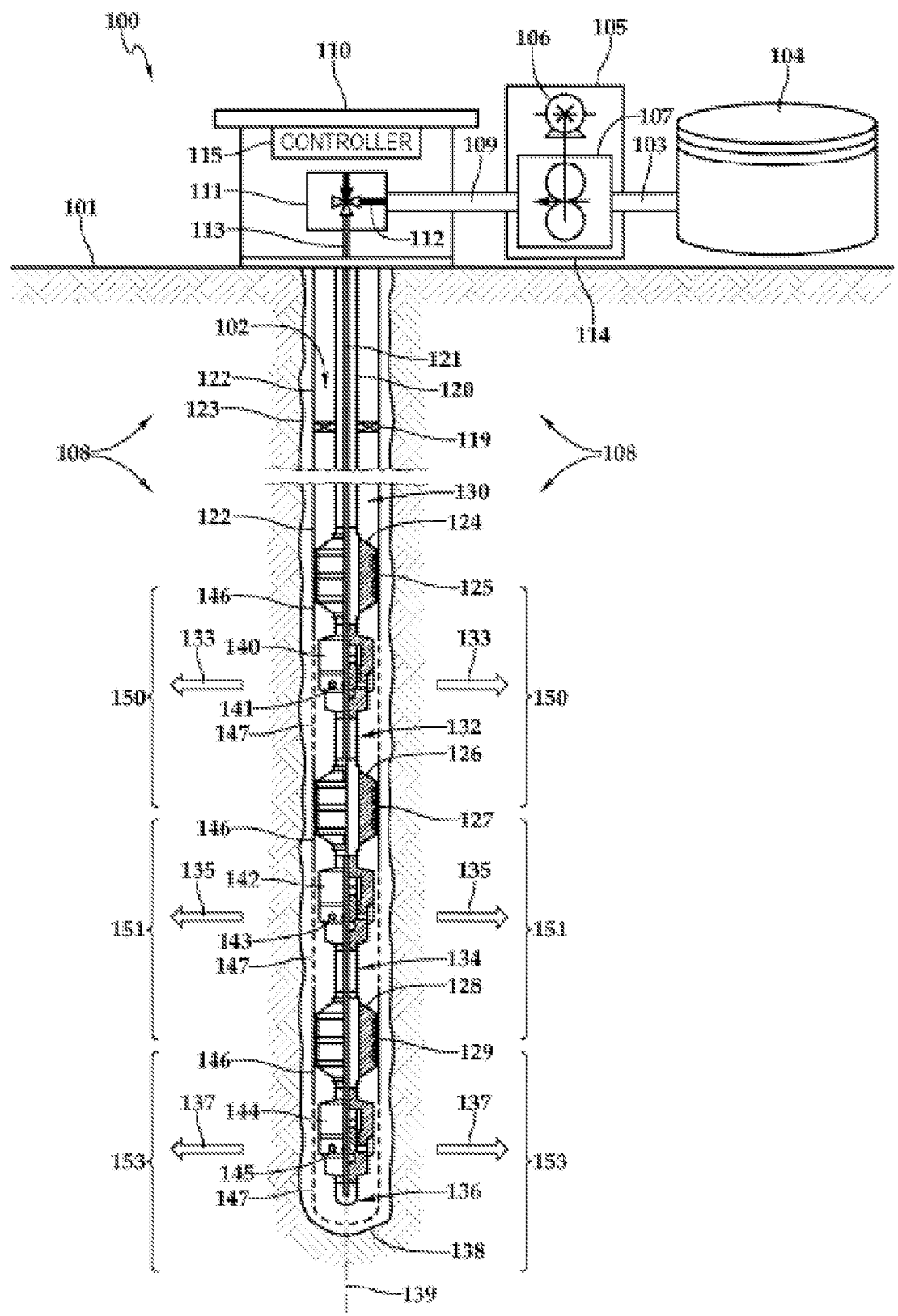
FIG. 1A illustrates a well system designed, manufactured and/or operated according to one or more embodiments of the disclosure.

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

The description that follows includes example systems, methods, techniques, and program flows that embody aspects of the disclosure. However, it is understood that this disclosure may be practiced without these specific details. For instance, this disclosure refers to use of carbon dioxide ($CO_2$) and hydrogen ($H_2$) in illustrative examples. Aspects of this disclosure can also use other types of gases, including combinations of one of those gases with another gas. In other instances, well-known instruction instances, protocols, structures and techniques have not been shown in detail in order not to obfuscate the description.

Example embodiments can be used as part of $CO_2$ sequestration in the subsurface formation. In some embodiments, a flow control valve is positioned to restrict injection of $CO_2$ when the $CO_2$ is in a low-density phase state, (e.g., a gas), and minimally restrict injection or fully allow injection when the $CO_2$ is in a high-density phase state, (e.g., a liquid). Other example embodiments may be used for storage of hydrogen ($H_2$) that can be an energy storage option, in some embodiments where $H_2$ can be injected and produced from a same wellbore.

Some embodiments can include a vapor-transition flow control valve that allows injecting of $CO_2$ in some embodiments, or hydrogen $H_2$ in other embodiments, into a formation or cavity. The vapor-transition flow control valve can ensure that the injected fluid is in a desired phase state, such as a liquid or a high density fluid, by allowing a flow of the fluid to be injected through or past the flow control valve only when the fluid that is provided to the valve is in the desired phase state, while blocking the flow of the fluid through the flow control valve when the fluid to be injected into the formation or cavity is not provided to the valve in the desired phase state. This can be important to ensure that the flow velocities of the injected fluid are low, the temperature of the injection fluid is appropriate, that control of the reservoir is maintained, and that a consistent flow distribution of the injected fluid is achieved in the wellbore.

Example embodiments can include an axially sliding piston-operated valve driven by a phase changing of a fluid contained within a sealed working fluid chamber of the flow control valve, (referred to as a working fluid or as a fill fluid). The axially sliding piston-operated valve is configured to be deployed in a borehole formed in a subterranean formation. For example, the axially sliding piston-operated valve can be integrated with production tubing that is positioned in the borehole as part of downhole operations. When the injection pressure of the fluid to be injected into the formation or cavity is high, the working fluid included in the sealed working fluid chamber can be compressed via the axially sliding piston and transition into a high density fluid phase state, thereby axially sliding a control arm to actuate a valve assembly of the flow control valve to an "open" configuration. With the valve assembly of the flow control valve in the "open" configuration, injection fluid provided to the flow control valve is allowed to pass the flow control valve and be injected into the subterranean formation. When the injection pressure of the fluid to be injected into the formation or cavity is low, the working fluid included in the valve can be less compressed, and transition into a low density fluid phase state, thereby axially sliding the control arm to actuate the valve assembly of the flow control valve to a "closed" configuration. With the valve assembly of the flow control valve in the "closed" configuration, injection fluid provided to the flow control valve is blocked from passing through or around the flow control valve, and thereby is blocked from being injected into the subterranean formation. Likewise, fluid already contained within the subterranean formation is prevented from flowing into the tubing.

In some embodiments, the working fluid used in the axially sliding piston-operated valve is selected to have a same (or a substantially similar) vaporization curve as compared to the fluid to be injected into the formation or cavity where the flow control valve is being employed. In some embodiments, the working fluid and the fluid to be injected can be defined as "substantially similar" if a variation in their vaporization curves is within a threshold. For example, the working fluid or fill fluid and the fluid to be injected can be defined as substantially similar if a variation in their vaporization curves is less than 1%, 5%, 10%, 25%, etc. In some embodiments, the working fluid and the fluid to be injected can be defined as substantially similar if the difference in their vapor transition is less than a threshold. For example, the working fluid and the fluid to be injected can be defined as substantially similar if the difference in their vapor transition is within 100 pounds per square inch (psi), 50 psi, 200 psi, etc.

In some embodiments, the working fluid and the fluid to be injected can be defined as the same or substantially similar based on their chemical composition. For example, the working fluid to be injected can have the same chemical composition, for example, both are $CO_2$, or both are $H_2$. In some embodiments, the working fluid and the fluid to be injected can be defined as substantially similar if the difference in their chemical composition is less than a threshold. For example, the working fluid and the fluid to be injected can be defined as substantially similar if the difference in their chemical composition is less than 1%, 5%, 10%, 25%, etc.

In some embodiments, the working fluid can be an azeotrope fluid. The azeotrope fluid in the sealed working fluid chamber of the axially sliding piston-operated valve may be a combination of fluids such that the transition temperature of the combined azeotrope fluids will be at a slightly lower temperature or a slightly higher temperature in relation to the injection fluid, and/or having a slightly lower pressure or slightly higher pressure than the injection fluid that is to be controlled using the flow control valve. In some embodiments, the working fluid can be at the same pressure as the fluid to be injected into the formation. In such embodiments, the phase change in the working fluid occurs at the same time as the injected gas within the tubing.

In some embodiments, the term "liquified" and "gaseous" can be used to describe the different phases of gas. Above the critical point, the gas is considered to be a supercritical fluid. Thus, the volume change can be used to create a valve that closes if the injection pressure is insufficient to inject a high-density fluid. As used in this disclosure, a "high density fluid" is any fluid at a temperature and pressure above its critical point or in its liquid form, and a "low density fluid" is any fluid in its vapor or gaseous phase with temperature and pressure below its critical point.

Also, while described in reference to being positioned in a production tubing for fluid injection into the subsurface formation (e.g., one that closes on the tubing string, such as a main tubing string, rather than on a sidewall), in some other embodiments, the valve can be used in other downhole configurations and applications. For example, the valve can be positioned in the well using traditional intervention techniques for fluid injection into the subsurface formation. In another example, such valves can be used axially along the borehole where they are installed using bridge plugs or lock mandrels to manage different zones into which fluid can flow.

Additionally, in some embodiments, a system can include multiple flow control valves positioned at different locations (e.g., different depth locations within the wellbore). In some embodiments, one or more of these flow control valves can have independent flow paths for injection into the formation. In some embodiments, one or more of these flow control valves may have different vaporization transitions. In some embodiments, multiple flow control valves can be installed into a single device at a given location along the wellbore. The flow control valves can be configured differently so that the number of open and closed flow control valves can be a function of downhole conditions at the device, which in turn is a function of surface injection conditions. Such embodiments can regulate flow when surface injection conditions are varied. Similarly, in some embodiments, multiple flow control valves can be positioned axially along the wellbore with a same or different configuration.

While described in reference to a phase valve, example embodiments can use any type of flow restriction in order to ensure that the injection fluid is in a high density fluid phase. Examples of flow restrictors that can be used include an inflow control device (ICD) (such as a nozzle, venturi, porous media, or tube), an autonomous inflow control device (AICD), autonomous inflow control device (AICV), a wireless smart well node, etc. In some embodiments, the injected fluid is achieving critical flow by moving at a sonic velocity with the flow restriction.

Furthermore, a device according to the disclosure can be installed in an already existing tubing string. In at least one embodiment, a device according to the disclosure could be installed on a lock nipple or a profile within the wellbore, among other locations. Additionally, in at least one other embodiment, a device according to the disclosure may be placed in the upper completion, while injection components are located in the lower completion.

FIG. 1A illustrates a diagram of a well system 100 configured for fluid injection into a subterranean formation, according to various embodiments of the disclosure. Although described below with respect to a well system configured to perform fluid injection of $CO_2$ into a formation, embodiments of the well system 100 are not limited to operations involving $CO_2$ injection, and may include fluid injection operations including other types of gases having various chemical compositions. As shown in FIG. 1A, various components including a storage reservoir or vessel 104, a fluid pump 105, and a wellhead 110 are located above a surface 101, and proximate a wellbore 102 extending below surface 101 into a subterranean formation 108.

Vessel 104 may be any type of vessel configured to contain the $CO_2$ that is to be injected into formation 108 using the well system 100 for permanent storage of the $CO_2$ in the formation. The use of the phrase "permanent storge" is not necessarily in reference to a particular timeframe, but refers to storage of the $CO_2$ without the intent to retrieve the $CO_2$ from the formation at some time in the future. The $CO_2$ contained in vessel 104 may have been produced from an oil and gas reservoir, generated for example as a result of a manufacturing process, or from some other man-made source, and was captured and placed in vessel 104 as an alternative to letting the $CO_2$ be emitted into the atmosphere. System 100 is configured to take the $CO_2$ contained in vessel 104, and to inject the $CO_2$ into formation 108 for permanent storage within the formation, as further described below.

As illustrated in FIG. 1A, vessel 104 is coupled to fluid pump 105 through fluid conduit 103, wherein fluid pump 105 is coupled to wellhead 110 through fluid conduit 109. In various embodiments, fluid pump 105 includes pump 107 configured to pump $CO_2$ provided through fluid conduit 103 to the wellhead 110 through fluid conduit 109. In various embodiments, pump 107 is powered by a pump driver, such as motor 106, which in various embodiments is an electric motor. The $CO_2$ provided to wellhead 110 is coupled through valve inlet 112 to one or more valves 111 configured to controllably couple a flow of fluid from the valve inlet 112 to the valve outlet 113. A controller 115, which may comprise a computing device with one or more processors and other computing devices, such a computer memory, may be coupled to devices such as the one or more valves 111, and is configured to control the operation of the one or more valves 111. In various embodiments, the controller 115 may also be configured to control the operation of the fluid pump 105 in order to regulate the pressure and/or the flow rate of $CO_2$ being provided to the wellhead 110 from vessel 104.

In various embodiments, fluid pump 105 may further include temperature control devices 114, which may include heating elements and/or a chiller/compressor unit configured to heat or cool, respectively, the fluid being provided to the wellhead 110, via heating and/or cooling. Heating or cooling of the fluid, in conjunction with the use of pump 105 to pressurize the fluid, may be controlled, in some embodiments by controller 115, in order to place the fluid into a desired and predetermined phase state for injection into the formation 108.

In well system 100, valve outlet 113 is coupled to be in fluid communication with a downhole fluid tubing (e.g., tubing) 121, which extends down into wellbore 102 and is enclosed within a tubing string 120. Tubing string 120 includes a hollow center passageway through which downhole fluid tubing 121 extends. Tubing string 120 is also physically coupled to one or more packers and to one or more flow control valve assemblies, which tubing string 120 helps secure within the wellbore 102. As shown for the well system 100, tubing string 120 extends from surface 101, and is positioned within and is encircled by upper casing 122, which also extends from surface 101 to some depth within wellbore 102 along a longitudinal axis 139 of the borehole. In various embodiments, at least some portion of the upper casing 122 may be encased in cement 123. In addition, one or more centralizers 119 may be positioned within the upper casing 122, the centralizers 119 configured to extend between the inner surface of the upper casing 122 and an outer surface of the tubing string 120, and thus stabilize the tubing string 120 with the upper casing.

In various embodiments, a packer 124 is positioned within upper casing 122 at some predetermined depth within wellbore 102, the packer 124 coupled to tubing string 120 and encircled by a sealing element 125 the extends between the packer 124 and the inner surface of the portion of the upper casing 122 where the packer 124 is positioned. A first flow control valve 140 is positioned downhole from packer 124, and is physically coupled to tubing string 120. The first flow control valve 140 includes one or more axially sliding pistons, as described herein, configured to control a flow of $CO_2$ through the first flow control valve 140 and into formation 108 in the areas of the formation 108 proximate to the location of first flow control valve 140 within the wellbore 102. Packer 124, in conjunction with sealing element 125, provide isolation of an annulus 132, which surrounds the flow control valve 140, from annulus 130, which extends from surface 101 to the uphole side of packer 124 and encircles the tubing string 120 within upper casing 122.

Internal fluid passageways within the first flow control valve 140 are in fluid communication with downhole fluid tubing 121, wherein the one or more axially sliding pistons are configured to controllably couple the internal fluid passageways of first flow control valve 140 to one or more passageways of the first flow control valve 140. As such, the one or more axially sliding pistons of the first flow control valve 140 are configured to allow $CO_2$ that is received at the first flow control valve 140 from the downhole tubing string 121 to be controllably released through the passageways and into annulus 132. The pressure of the $CO_2$ released into annulus 132 drives the $CO_2$ through perforations 147 extending along wellbore 102 in the vicinity of the first flow control valve 140, and out into formation 108, as illustratively represented by arrows 133. In various embodiments, only one flow control valve, such as first flow control valve 140, is included in well system 100, wherein the $CO_2$ released from the passageways is configured to fill the borehole extending below packer 124, and to exit the borehole through one or more sets of perforations 147 for injection into formation 108.

In the alternative, in the well system 100 as illustrated in FIG. 1A, three sets of flow control valves, 140, 142, and 144 are shown, the flow control valves spaced apart from one another along the wellbore 102, and wherein each of the flow control valves is surrounded by a respective annulus (132, 134, 136), which are isolated from one another by packers 126 and 128, and wherein the upper-most annulus 132 surrounding the first flow control valve 140 is isolated from the annulus 130 extending to surface 101 by packer 124. Each of the flow control valves are in fluid communication with tubing 121, and thus are configured to receive a flow of fluid being provided from the surface 101 through tubing 121. As illustrated in FIG. 1A, the passageway of the first flow control valve 140 may be directed to perforations 147 adjacent to annulus 132, and further directed into formation 108 in a zone generally indicated as zone 150. Similarly, the passageways of the second flow control valve 142 may be directed to perforations 147 adjacent to annulus 134, and further directed into formation 108 in a zone generally indicated as zone 151, while the passageways of the third flow control valve 144 may be directed to perforations 147 adjacent to annulus 136, and further directed into formation 108 in a zone generally indicated as zone 153. As such, the arrangement of the flow control valves and the packers isolating the annuluses surrounding the flow control valves, respectively, may contribute to better control and dispersion of the fluid into formation 108 along the entirety of the wellbore 102 designated for fluid injection.

The arrangement of the flow control valves and packers as shown in FIG. 1A is one non-limiting example of a well system, such as well system 100, and other variations are possible and are contemplated for use in various embodiments of well system 100. For example, the number of flow control valves included in a particular well system is not limited to a particular number of flow control valves, and may include one or more flow control valves. Examples of well system 100 are not limited to having the flow control valves positioned at a particular depth from surface 101, and may include flow control valves positioned at varying depths, for example based on the location of a formation material that is determined to be useful for the storage of a fluid, such as $CO_2$, within the formation material. In various embodiments, the flow control valves that are included in a well system 100 may or may not be evenly spaced relative to one another along the wellbore, and may include groups of one or more flow control valves that are spaced apart from another group of flow control valves by a distance along the wellbore that is different from the spacing between other groups of valve assemblies.

In various embodiments of a well system, a single packer may be used to isolate the annuluses surrounding each of the flow control valves included in the well system from the annulus extending to the surface of the well system. In various embodiments, each of the flow control valves included in a well system may be isolated from the other flow control valves included in the well system by a set of packers positioned uphole and downhole from the location of each of the flow control valves. In various embodiments, a group of two or more flow control valves may be isolated by a pair of packers so that the group of two or more flow control valves is configured to be in fluid communication with a common annulus. These and other variations of the flow control valves and packer arrangements are possible and are contemplated for use in configurations of well systems that may be utilized for fluid injection operations as described herein, and any equivalents thereof. Further, while wellbore 102 is shown as comprising a vertically oriented borehole, embodiments of wellbores where the valve assemblies may be deployed are not limited to wellbores having any particular orientation, and may include vertical, horizontal, and/or inclined wellbore s, and combination of these, including well systems including one or more branches coupled to a main, a secondary, or other network(s) of a wellbore.

In operation, $CO_2$ stored in vessel 104 is pumped to the wellhead 110 by fluid pump 105 in a phase state that is desirable for injection of the $CO_2$ into formation 108. In various embodiments, that desired state includes $CO_2$ in a high-density fluid phase. In various embodiments, the temperature of the fluid received from the vessel 104 may be altered by one or more temperature control devices 114 in order to allow the pump 107 to pressurize the fluid while allowing the fluid to be transformed into and/or maintained in a desired phase state for injection into formation 108. The high-density fluid $CO_2$ is coupled through valves 111 and into the downhole fluid tubing 121, where it passed through the downhole fluid tubing 121 and is provided to each of the flow control valves 140, 142, 144.

When the $CO_2$ is provided to the flow control valves in the desired phase state, the axially sliding piston included in the flow control valves is/are configured to actuate to an "open" configuration, allowing the $CO_2$ to flow through or past the valve assembly, and exit through one or more of fluid passageways, to a respective annulus, and then to flow through perforations 147 in the casing liner of the wellbore and into the formation 108. Arrows 133 represent the flow of $CO_2$ exiting the first flow control valves 140 and flowing into formation 108 in zone 150. Arrows 135 represent the flow of $CO_2$ exiting passageways of the second flow control valve 142, and flowing into formation 108 in zone 151. Arrows 137 represent the flow of $CO_2$ exiting passageways of the third flow control valve 144 and flowing into formation 108 in zone 153.

In the event the $CO_2$ arriving at the flow control valves 140, 142, and 144 via the downhole fluid tubing 121 is not in the desired phase state, for example is in a low density phase, the axially sliding pistons are configured to actuate to a "closed" configuration, and to block the flow of the $CO_2$ from passing through the flow control valves and into the formation 108. In addition, if the fluid pressure present in the formation rises to a level that exceeds the pressure present in the $CO_2$ arriving at the valve assembles from the surface, the phase of the $CO_2$ present in the backflow will again cause the axially sliding pistons to actuate to the "closed" position, thereby preventing the $CO_2$ from escaping from the formation 108 back through the flow control valves, and in conjunction with the packers present in the wellbore, from escaping from the formation 108 back through the wellbore. Thus, the axially sliding pistons of the flow control valves are configured to allow a flow of $CO_2$ provided to the flow control valves in the desired phase state to be distributed and injected into formation 108, while blocking the flow of $CO_2$ into the formation when the $CO_2$ provided to the flow control valves from the surface is not in the desired phase state.

In various embodiments, the tubing string 120 is configured to be removable, along with the flow control valves and/or the packers coupled to the tubing string, upon completion of the fluid injection operations that are to be performed on wellbore 102. In various embodiments, after removal of tubing string 121, the wellhead may be sealed off to provide a fluid seal between the wellbore 102 and areas above the surface.

Figure 1B:
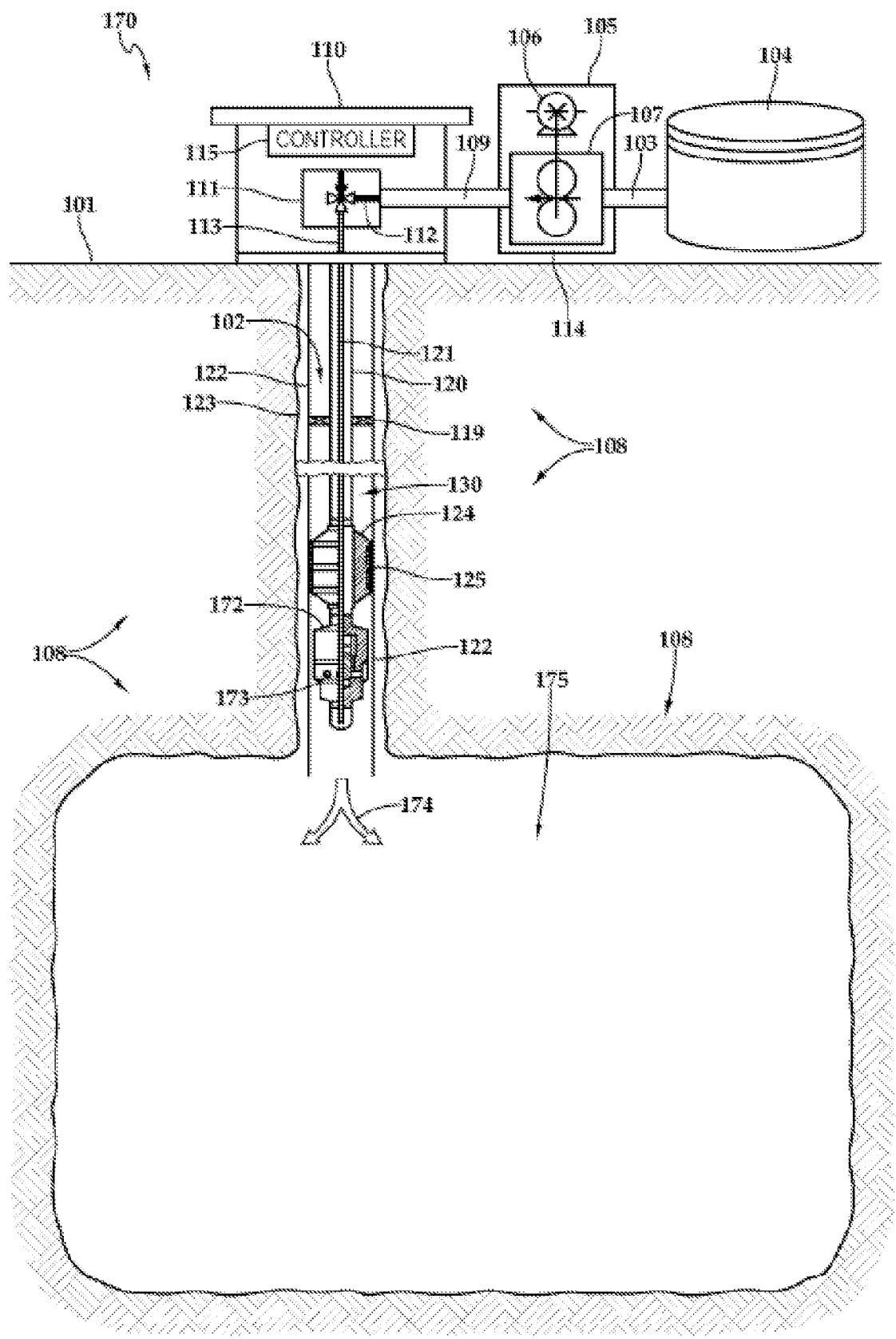
FIG. 1B illustrates a well system designed, manufactured and/or operated according to one or more alternative embodiments of the disclosure.

Turning to FIG. 1B, illustrated is a diagram of a well system 170 configured for fluid injection into a subterranean formation comprising a cavity, according to various embodiments. Although described below with respect to a well system configured to perform fluid injection of $H_2$ into a cavity 175, embodiments of the well system (e.g., system) 170 are not limited to operations involving $H_2$, and may include fluid injection operations including other types of fluids having various chemical compositions. As shown in FIG. 1B, the well system 170 includes components above surface 101 and proximate to wellbore 102 that are the same as or similar to components described above with respect to vessel 104, fluid pump 105, and wellhead 110. In various embodiments, these above-surface components are configured to deliver a flow of fluid comprising $H_2$ through tubing 121 to wellbore 102. Tubing 121 is coupled to and is in fluid communication with a flow control valve 172, which includes one or more axially sliding pistons configured to controllably provide a flow of the $H_2$ provided to the flow control valve 172 to passageway 173. Any $H_2$ exiting passageway 173 of the flow control valve 172 is dispensed into the annulus surrounding the flow control valve 172, and may then be dispersed out the end of casing 122 and into cavity 175, as illustratively represented by arrows 174. A packer 124, in conjunction with sealing element 125, provides a fluid seal positioned uphole of the flow control valve 172, and is configured to prevent any $H_2$ that exits passageway 173 from traveling back uphole past the flow control valve 172 and into annulus 130.

The flow control valve 172 may include one or more axially sliding pistons configured with a chamber comprising a working fluid that allows each of the one or more axially sliding pistons to allow a flow of $H_2$ through the respective flow control valve when the $H_2$ provided by the tubing 121 to the valve assembly is in the desired phase state, and to block a flow of $H_2$ through the respective flow control valve when the $H_2$ provided by the tubing 121 to the valve assembly is not in the desired phase state. In various embodiments, the desired phase state for the $H_2$ provided by the tubing 121 is a liquid or supercritical phase state (high density fluid), which when provided to the flow control valve is configured to cause the one or more axially sliding pistons of the flow control valve 172 to actuate to an "open" configuration and provide a fluid passageway of the $H_2$ to flow from tubing 121, through or around the flow control valves, and to be expelled from the flow control valve and into cavity 175.

In various embodiments, the flow control valve 172 is configured so that a minimum pressure is maintained within cavity 175. In some embodiments, the minimum pressure that is to be maintained in the cavity 175 is in a range of 500 to 5000 pounds/square inch (PSI). In various embodiments, the minimum pressure level to be maintained within cavity 175 is set in order to assure the structural integrity of cavity 175, and for example to assure against a collapse of any portion of the cavity.

Figure 2A:
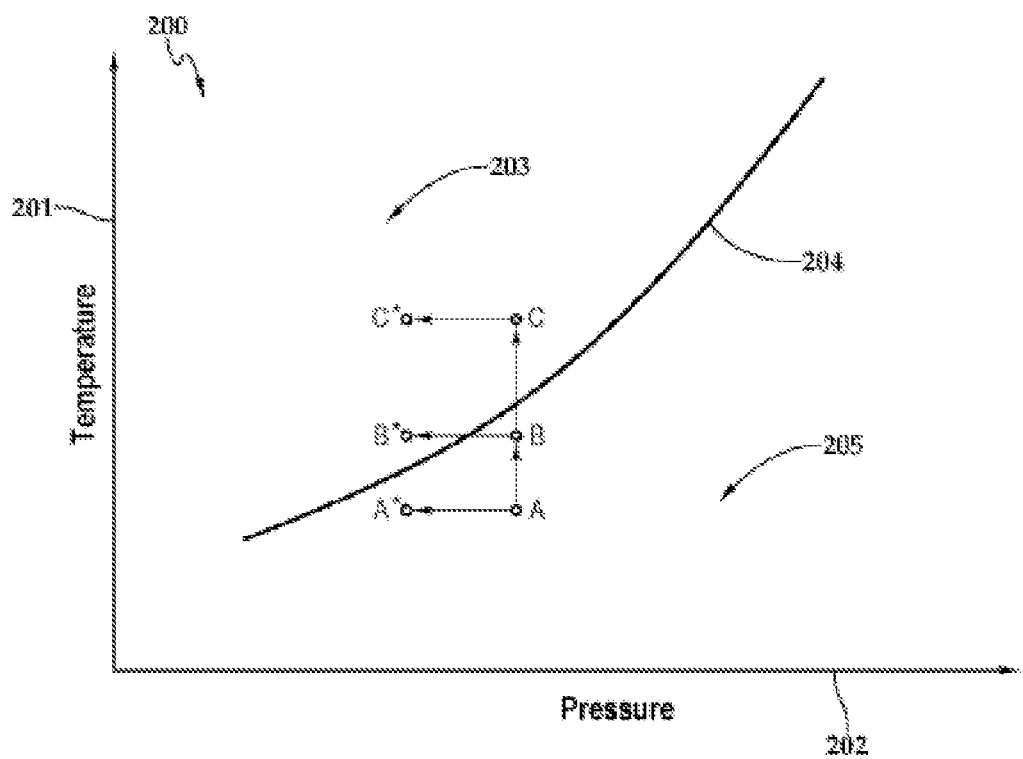
FIG. 2A illustrates a phase diagram for $CO_2$.

FIG. 2A illustrates a phase diagram 200 for $CO_2$. Phase diagram 200 includes a vertical axis 201 representing temperatures (temperature increases moving upward in the diagram), and horizontal axis 202 representing pressure (increasing pressure moving in the right-hand direction in the diagram). Graphical line 204 represents the vaporization curve for $CO_2$. For temperature/pressure combinations that fall above graphical line 204, as illustratively represented by the area 203 within phase diagram 200, $CO_2$ is in a low-density gaseous phase state. For temperature/pressure combinations that fall below and to the right of graphical line 204, as illustratively represented by area 205 within the phase diagram 200, $CO_2$ is in a high-density fluid phase state.

As shown by phase diagram 200, the vaporization curve represented by graphical line 204 for $CO_2$ requires increasing temperature as the pressure increases for the $CO_2$ to be in the low-density fluid phase state. By way of illustrations, phase diagram 200 includes three illustrative points: Point A, Point B, and Point C. At point A, the temperature/pressure combination is below the vaporization curve represented by graphical line 204, and therefore $CO_2$ at this temperature/pressure combination is a high density fluid. If the pressure of the $CO_2$ is reduced to now include a temperature/pressure combination for the $CO_2$ represented by point A*, point A* is still below the vaporization curve, and therefore $CO_2$ at the temperature/pressure combination represented by point A* is still a high density fluid, and has not changed phase state relative to $CO_2$ at point A due to the lowering of the temperature represented by the change in the temperature/pressure combination from point A to point A*.

At point B, the temperature/pressure combination is below the vaporization curve represented by graphical line 204, and therefore $CO_2$ at this temperature/pressure combination is a high density fluid. If the pressure of the $CO_2$ is reduced to now include a temperature/pressure combination for the $CO_2$ represented by point B*, the temperature/pressure combination at point B* is above the vaporization curve, and therefore the $CO_2$ is a low density fluid. As such, in moving from point B to point B* the $CO_2$ will have transitioned from a high density fluid to a low density phase state.

At point C, the temperature/pressure combination is above the vaporization curve represented by graphical line 204, and therefore $CO_2$ at this temperature/pressure combination is in a low density fluid state. If the pressure of the $CO_2$ is reduced to now include a temperature/pressure combination for the $CO_2$ represented by point C*, point C* is still above the vaporization curve, and therefore $CO_2$ at the temperature/pressure combination represented by point C* is still in a low density fluid state, and has not changed phase state relative to $CO_2$ at point C due to the lowering of the temperature represented by the change in the temperature/pressure combination from point C to point C.

Thus, as illustratively represented by the points A, B, C, and A*, B*, and C* in phase diagram 200, any phase-based control of the fluid using phase control flow valves cannot be based solely on temperature of the fluid, since at a same temperature of the $CO_2$ the $CO_2$ could be in a low density or a high density state. Further, the phase-based control of the fluid using these same phase control valves cannot be based solely on the pressure of the $CO_2$, since at a same pressure the $CO_2$ could be in a low density or a high density state. In the embodiments as described herein, it is desirable to have the $CO_2$ in a high-density fluid phase.

As further described below, the working fluid included in the sealed working fluid chamber of the flow control valve may be designed to have a vaporization curve that is the same as or similar to the vaporization curve for $CO_2$. As such, the working fluid will transition from a high density phase to the low density phase, and thus expand in volume, at a lower pressure then the fluid outside of the chamber. As such, when the $CO_2$ that is to be injected into the formation in a high density phase state, such as at point B in diagram 200, is provided to the flow control valve, the working fluid in the valve may be at the lower pressure represented by point B*, and thus has transitioned to a low density phase state, thereby expanding and actuating the valve to a "closed" configuration. In the closed configuration, the flow of $CO_2$ through or past the flow control valve is blocked. As such, in order for the $CO_2$ that is intended to be injected into the formation to get past the flow control valve it must be provided to the flow control valve in not only the desired phase state, e.g., a high density fluid phase state, but also at a temperature/pressure combination that is far away enough from the vaporization curve so that the lower pressure of the working fluid contained within the sealed working fluid chamber of the flow control valve(s) does not transition to the low density phase state, but instead remains in the high density fluid phase state in order to maintain the flow control valve in the "open" configuration.

The injection of the $CO_2$ in the high-density fluid state allows for better control and a more even distribution of the $CO_2$ into the formation material. As such, embodiments of the flow control valve as described herein are configured to allow a flow of $CO_2$ past the flow control valve and to be injected into a subterrain formation when the $CO_2$ presented at the flow control valve is in the high density fluid phase state, and to block the flow of $CO_2$ into the subterranean formation when the $CO_2$ presented at the flow control valve is not in the high density fluid phase state, but instead is for example in the low density fluid phase state.

Figure 2B:
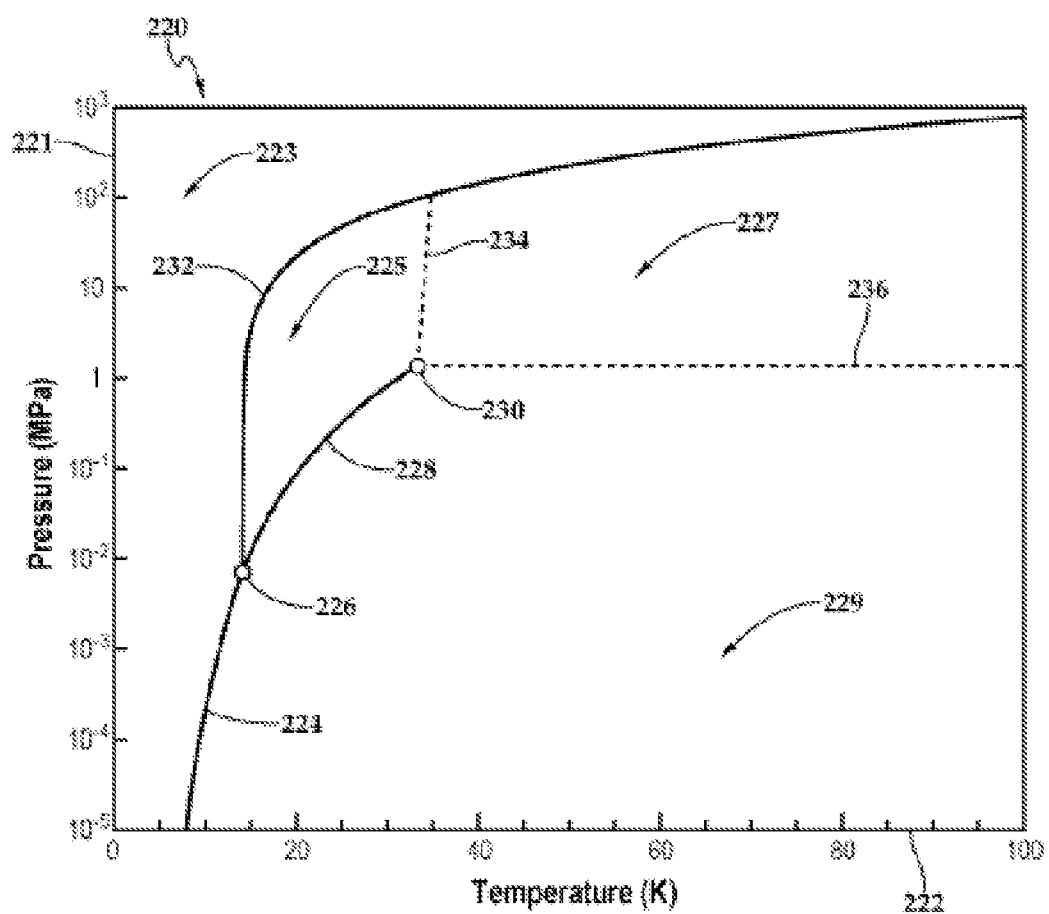
FIG. 2B illustrates a phase diagram for $H_2$.

FIG. 2B illustrates a phase diagram 220 for $H_2$. Phase diagram 220 includes a vertical axis 221 representing pressure in megapascal (Mpa), and horizontal axis 222 representing temperature in degrees Kelvin (K). Graphical line 224 represents a sublimation curve extending from the horizontal axis 222 to triple point 226. Graphical line 228 represents a saturation curve and extends from triple point 226 to critical point 230, and graphical line 232 represents the melting curve that extends upward and away from triple point 226. The area 229, which is bounded by an area to the right of sublimation curve 224 and saturation curve 228 and below dashed line 236, includes temperature/pressure combinations where $H_2$ is in a gas phase state. The area 225, which is bounded by and below melting curve 232, above and bounded by saturation curve 228, and bounded by and to the left of dashed line 234, includes temperature/pressure combinations where $H_2$ is a liquid. The area 223, which is above and to the left of saturation curve 224 and melting curve 232 includes temperature/pressure combinations where $H_2$ is in a solid phase. The area 227 below melting curve 232, bounded on the left by dashed line 234, and above and bounded by dashed line 236 includes temperature/pressure combinations where $H_2$ is in a supercritical state. In various embodiments, the $H_2$ that is to be delivered to the vapor-transition flow control valves for storge in a subterranean formation or cavity is to be in a supercritical phase state or liquid (high density fluid state), and the flow control valves are configured to actuate to an "open" configuration and allow a flow of the $H_2$ through the valves only when the $H_2$ presented to the valves is in the high density fluid state.

As such, embodiments of the vapor-transition flow control valves as described herein are configured to allow a flow of $H_2$ through or past the flow control valve, and to be injected into a subterrain formation or cavity when the $H_2$ presented at the flow control valve is in the high density fluid phase state, and to block the flow of $H_2$ into the subterranean formation or cavity when the $H_2$ presented at the flow control valve is not in the high density fluid phase state, for example in the gas or vapor phase states.

Given that disclosed above in FIGS. 2A and 2B, a high density fluid and a low density fluid may be defined in one or more different ways. In at least one embodiment, low density is less than the density of the fluid at its Triple Point (e.g., 467 kg/m³ for $CO_2$) and high-density is anything greater than this point. In yet another embodiment, low density is the fluid in its gaseous phase while high density is the fluid in a non-gaseous phase e.g., (liquid or super critical). In even yet another embodiment, low and high density may be defined differently for different fluids. For example, for $CO_2$, low density would be a fluid with a density less than 200 kg/m³, and high density would be a fluid with a density greater than this. Similarly, for $H_2$, low density would be a fluid with a density less than 10 kg/m³, and high density would be a fluid with a density greater than this. In yet another embodiment, it could be defined by a ratio of the above.

Figure 3:
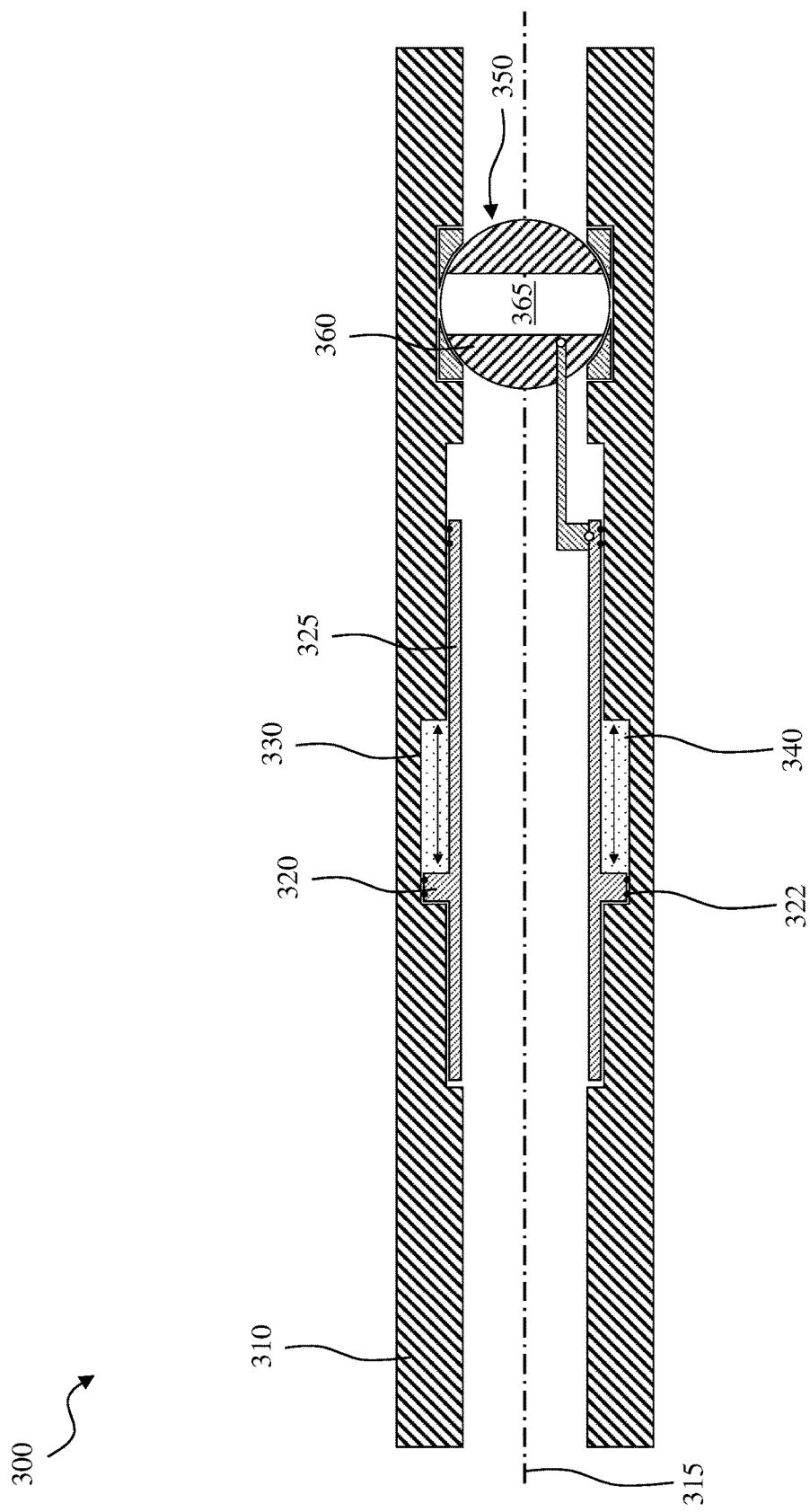
FIG. 3 illustrates a cross-sectional view of a flow control valve designed, manufactured and/or operated according to one or more embodiments of the disclosure.

Turning to FIG. 3, illustrated is a cross-sectional view of a flow control valve 300 designed, manufactured and/or operated according to one or more embodiments of the disclosure. The flow control valve 300, in one or more embodiments, includes a tubular 310. The tubular 310, in one embodiment, has a central longitudinal axis 315, and is configured to be positioned downhole in a wellbore. For example, in at least one embodiment, the tubular 310 is configured to be connected in-line with a wellbore tubular (e.g., production tubular, coiled tubing, etc.).

The flow control valve 300, in one or more other embodiments, further includes a piston 320 located in the tubular 310. In one or more embodiments, the piston 320 is configured to separate injection fluid (e.g., not shown in FIG. 3) located within the tubular 310 from a working fluid 340 located in a sealed working fluid chamber 330, for example using one or more sealing members 322 (e.g., O-rings). The working fluid 340 may comprise any of the different working fluids disclosed above, for example depending on the operation of the device and the injection fluid used. Thus, in at least one embodiment, the working fluid 340 may comprise the same fluid as the injection fluid, such as $CO_2$, or an azeotrope of the injection fluid, such as an azeotrope of $CO_2$, among others.

The flow control valve 300, in one or more embodiments, further includes a control arm 325 coupling the piston 320 to a valve assembly 350 located within the tubular 310. In the illustrated embodiment of FIG. 3, the control arm 325 forms at least a portion of a sliding sleeve. The valve assembly 350 may comprise a variety of different valve assemblies while remaining within the scope of the present disclosure. In one or more embodiments, however, the valve assembly 350 is a ball valve 360 having a central fluid aperture 365. The central fluid aperture 365, in one or more embodiments, is configured to be substantially parallel with the longitudinal axis 315 when the valve assembly 350 is in the open position and substantially transverse to the longitudinal axis 315 when the valve assembly 350 is in the closed position. The phrase "substantially parallel", when discussed with regard to the central fluid aperture 365, means that the central fluid aperture 365 is within 10 degrees from parallel with the longitudinal axis 315. The phrase "substantially transverse", when discussed with regard to the central fluid aperture 365, means that the central fluid aperture 365 is within 10 degrees from transverse with the longitudinal axis 315.

Turning to FIGS. 4A through 4F, illustrated are different operational states of a flow control valve 400 designed, manufactured and/or operated according to one or more embodiments of the disclosure. The flow control valve 400 of FIGS. 4A through 4F is similar in many respects to the flow control valve 300 of FIG. 3. Accordingly, like reference numbers have been used to illustrate similar, if not identical, features.

Figure 4A:
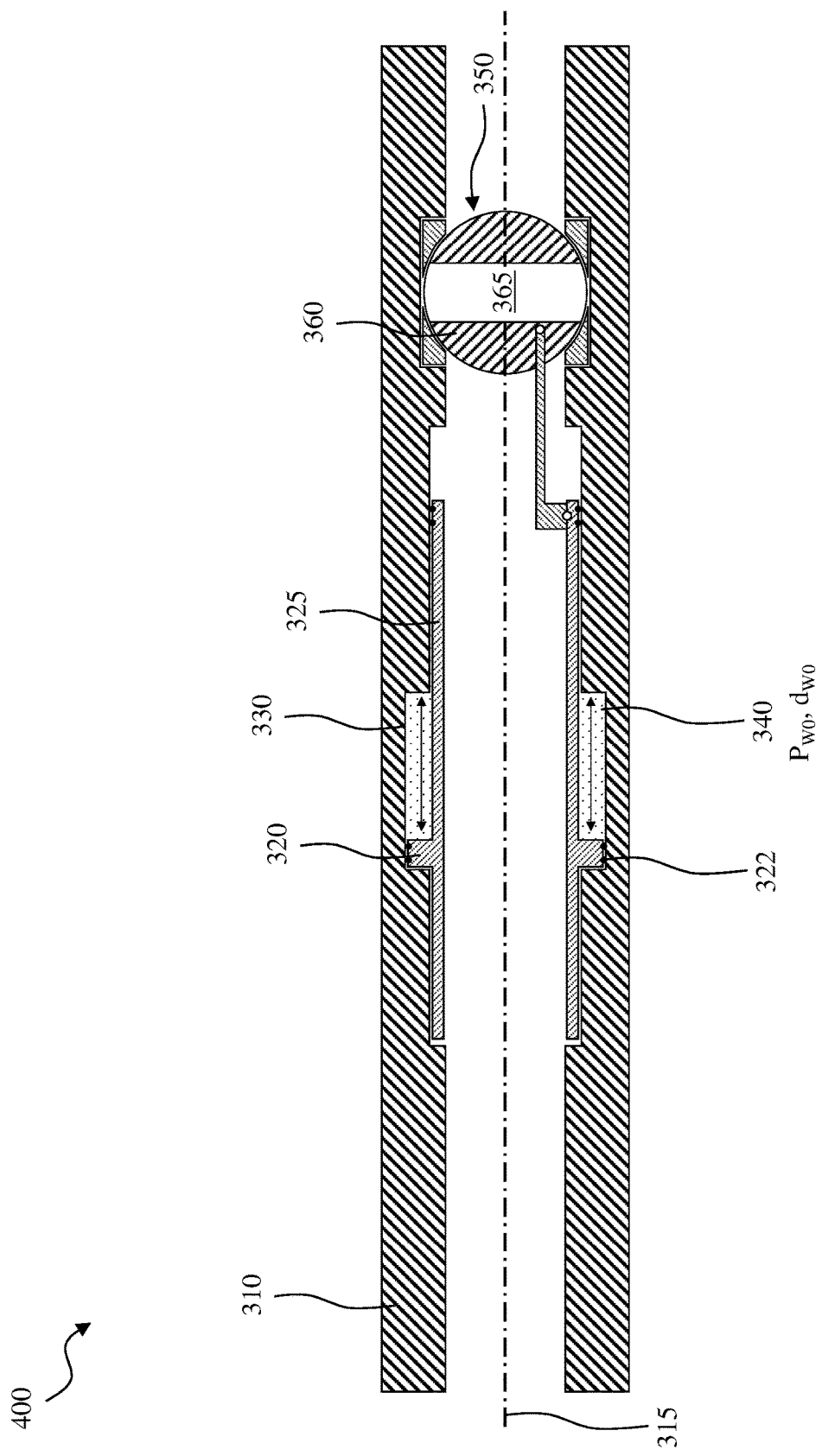
FIGS. 4A through 4F illustrate different operational states of a flow control valve designed, manufactured and/or operated according to one or more embodiments of the disclosure.

With initial reference to FIG. 4A, the flow control valve 400 is illustrated in its uphole state. Accordingly, the working fluid 340 within the sealed working fluid chamber 330 (e.g., without any injection fluid within the tubular 310 and/or wellbore fluid within the tubular 310), holds the piston 320, and thus the control arm 325, toward the left (e.g., in this embodiment). Furthermore, with the piston 320 and the control arm 325 in the left most position, the valve assembly 350 is held in its closed position. In the illustrated embodiment of FIG. 4A, the working fluid 340 has a working fluid pressure ($P_{W0}$) and a working fluid density ($d_{W0}$). In one example embodiment, the working fluid pressure ($P_{W0}$) and the working fluid density ($d_{W0}$) might be 780 psi and 150 kg/m³, respectively.

Figure 4B:
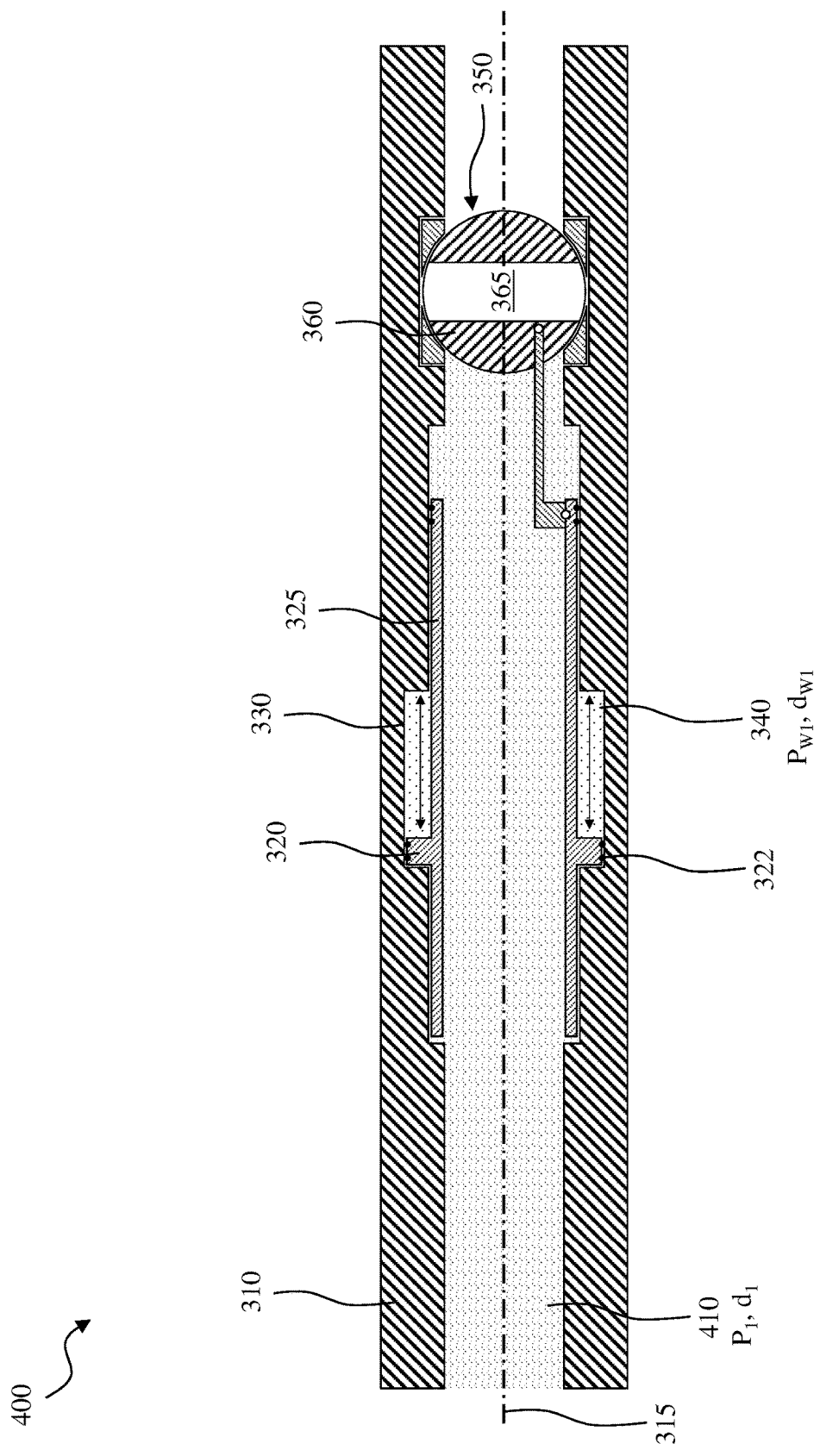

Turning to FIG. 4B, illustrated is the flow control valve 400 of FIG. 4A after positioning it within a wellbore, but before pumping injection fluid down the tubular 310 and into engagement with the piston 320. In the illustrated embodiment of FIG. 4B, wellbore fluid 410 is located within the tubular 310 and imparting pressure on an opposite side of the piston 320 as the working fluid 340. In the illustrated embodiment of FIG. 4B, the wellbore fluid has 410 has a wellbore fluid pressure ($P_1$) and a wellbore fluid density ($d_1$), and the working fluid 340 has a working fluid pressure ($P_{W1}$) and a working fluid density ($d_{W1}$). In one example embodiment, the wellbore fluid pressure ($P_1$) and a wellbore fluid density ($d_1$) might be 15 psi and 1 kg/m³, respectively, and the working fluid pressure ($P_{W1}$) and working fluid density ($d_{W1}$) might be 1200 psi and 150 kg/m³, respectively, for example at a typical wellbore temperature of 200 degrees Fahrenheit.

Figure 4C:
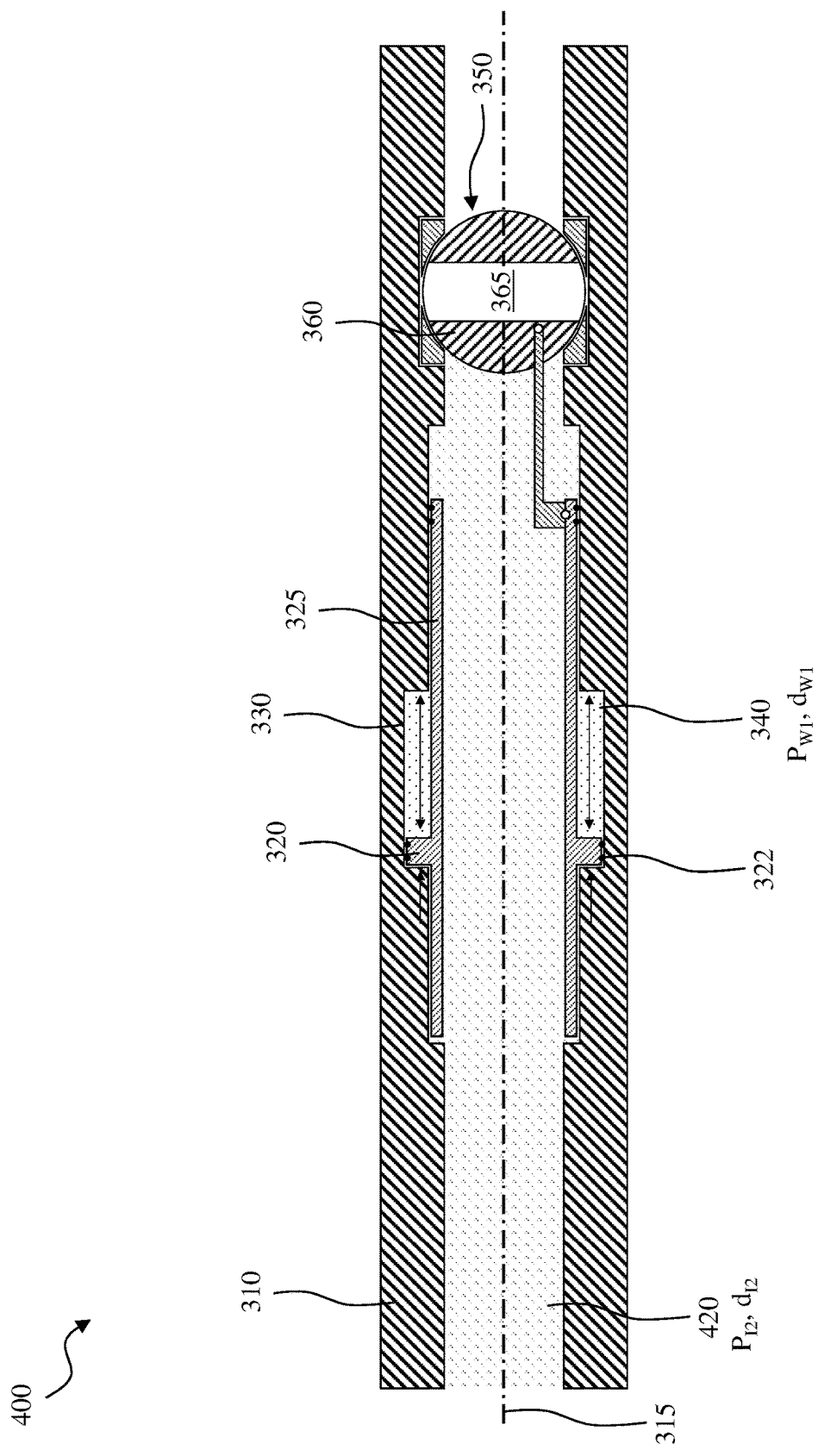

Turning to FIG. 4C, illustrated is the flow control valve 400 of FIG. 4B after pumping injection fluid 420 down the tubular 310 and into engagement with the piston 320. In the illustrated embodiment of FIG. 4C, the injection fluid has 420 has an injection fluid pressure ($P_{I2}$) and an injection fluid density ($d_{I2}$), and the working fluid 340 still has the working fluid pressure ($P_{W1}$) and a working fluid density ($d_{W1}$). In one example embodiment, the injection fluid pressure ($P_{I2}$) and injection fluid density ($d_{I2}$) might be 1000 psi and 125 kg/m³, respectively, and the working fluid pressure ($P_{W1}$) and a working fluid density ($d_{W1}$) might remain 1200 psi and 150 kg/m³, respectively, again at a typical wellbore temperature of 200 degrees Fahrenheit. Given these example values, the piston 320 remains to the left (e.g., in the example embodiment).

Figure 4D:
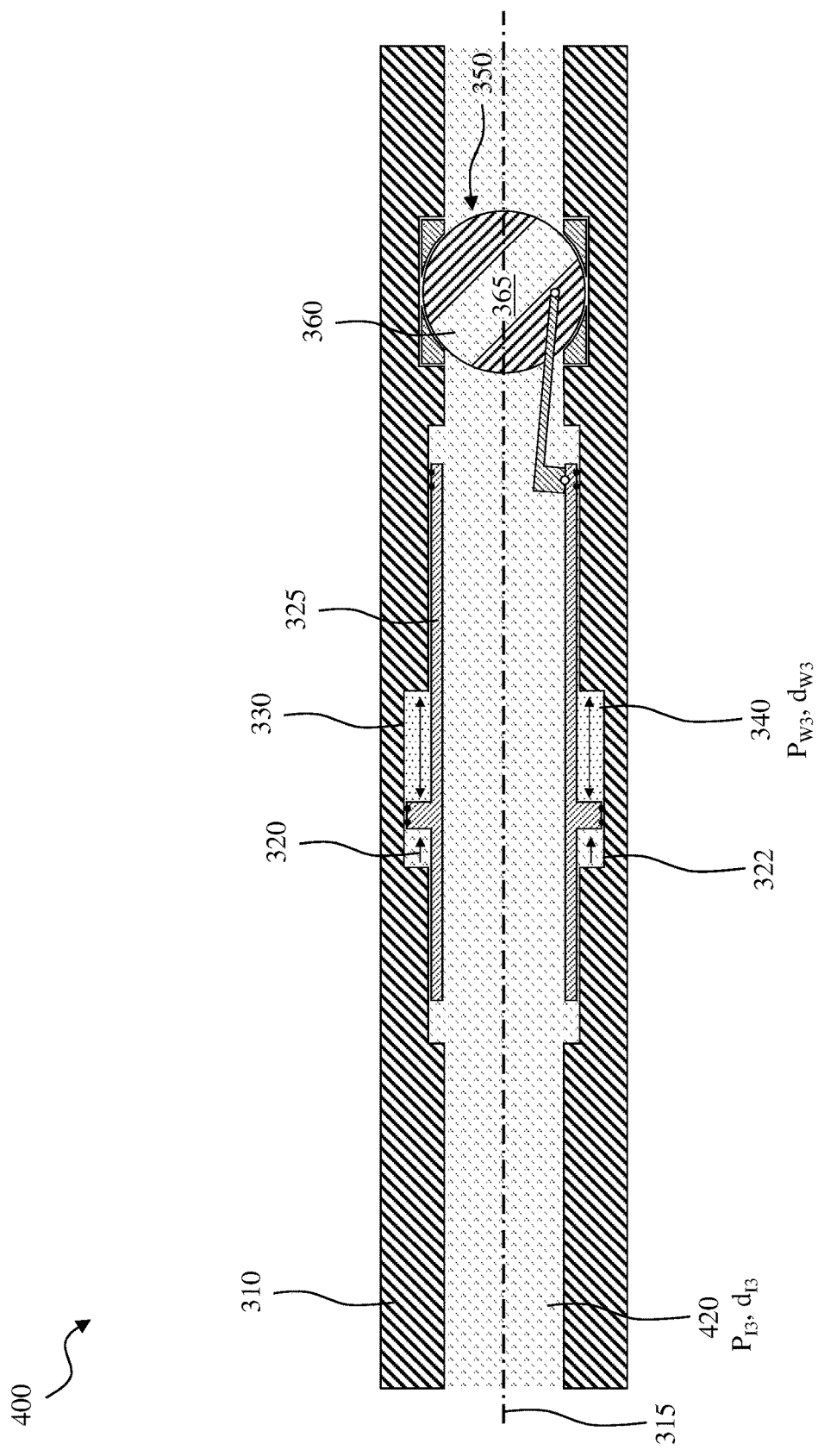

Turning to FIG. 4D, illustrated is the flow control valve 400 of FIG. 4C after starting to increase the injection pressure of the injection fluid 420. In the illustrated embodiment of FIG. 4D, the injection fluid has 420 has an injection fluid pressure ($P_{I3}$) and an injection fluid density ($d_{I3}$), and the working fluid 340 has a working fluid pressure ($P_{W3}$) and a working fluid density ($d_{W3}$). In one example embodiment, the injection fluid pressure ($P_{I3}$) and injection fluid density ($d_{I3}$) might be 1600 psi and 225 kg/m³, respectively, and the working fluid pressure ($P_{W3}$) and the working fluid density ($d_{W3}$) might be 1600 psi and 225 kg/m³, respectively, again at a typical wellbore temperature of 200 degrees Fahrenheit. In this state, a volume of the sealed working fluid chamber 330 is only about 75 percent of the sealed working fluid chamber 330 of FIG. 4C. As shown in FIG. 4D, the valve assembly 350 is thus positioned about halfway between the open position and the closed position.

Figure 4E:
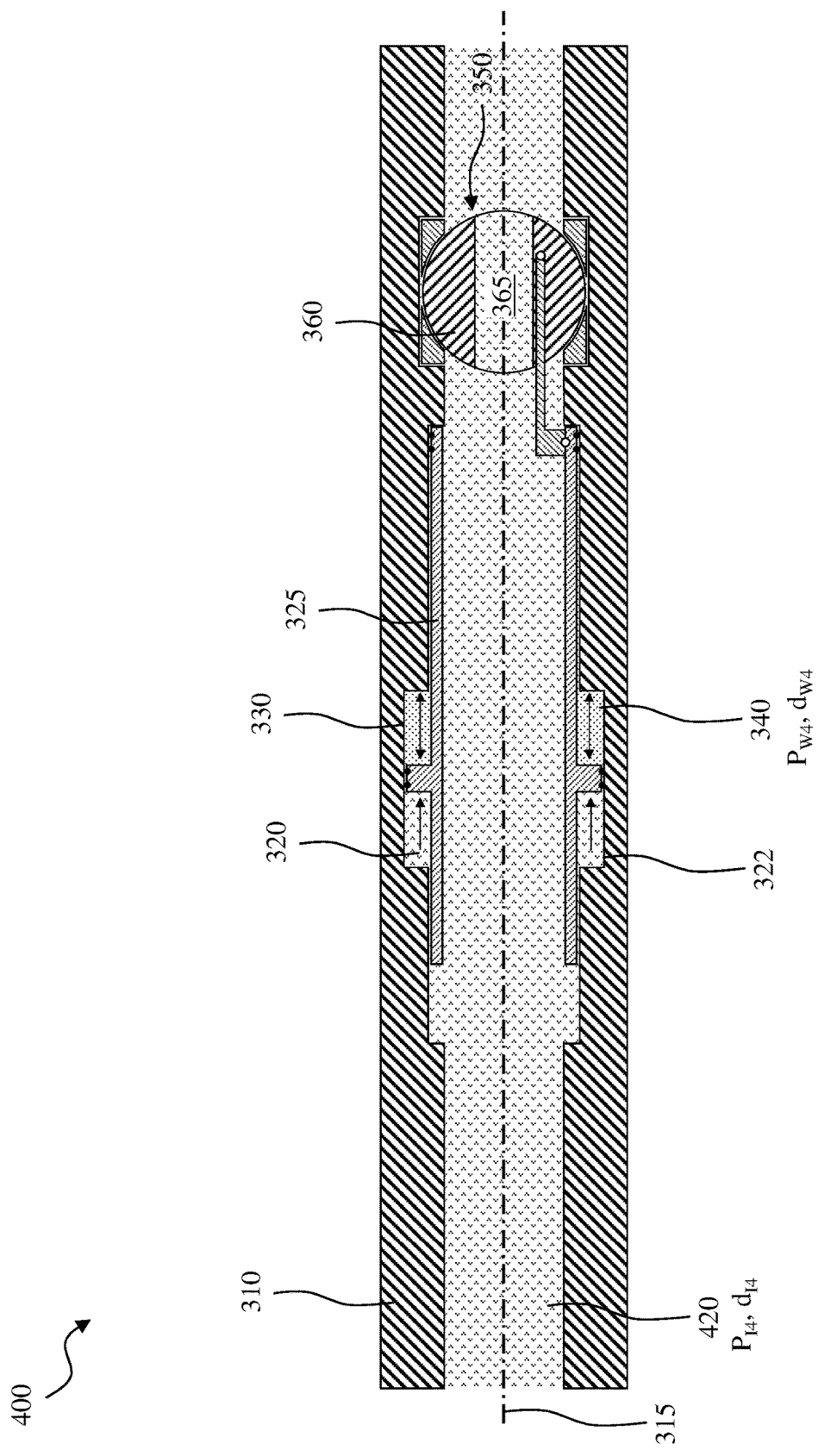

Turning to FIG. 4E, illustrated is the flow control valve 400 of FIG. 4D after continuing to increase the injection pressure of the injection fluid 420. In the illustrated embodiment of FIG. 4E, the injection fluid has 420 has an injection fluid pressure ($P_{I4}$) and an injection fluid density ($d_{I4}$), and the working fluid 340 has a working fluid pressure ($P_{W4}$) and a working fluid density ($d_{W4}$). In one example embodiment, the injection fluid pressure ($P_{I4}$) and injection fluid density ($d_{I4}$) might be 2000 psi and 300 kg/m³, respectively, and the working fluid pressure ($P_{W4}$) and a working fluid density ($d_{W4}$) might be 2000 psi and 300 kg/m³, respectively, again at a typical wellbore temperature of 200 degrees Fahrenheit. In this state, a volume of the sealed working fluid chamber 330 is about 50 percent of the sealed working fluid chamber 330 of FIG. 4C. As shown in FIG. 4E, the valve assembly 350 is now positioned in its open position.

Figure 4F:
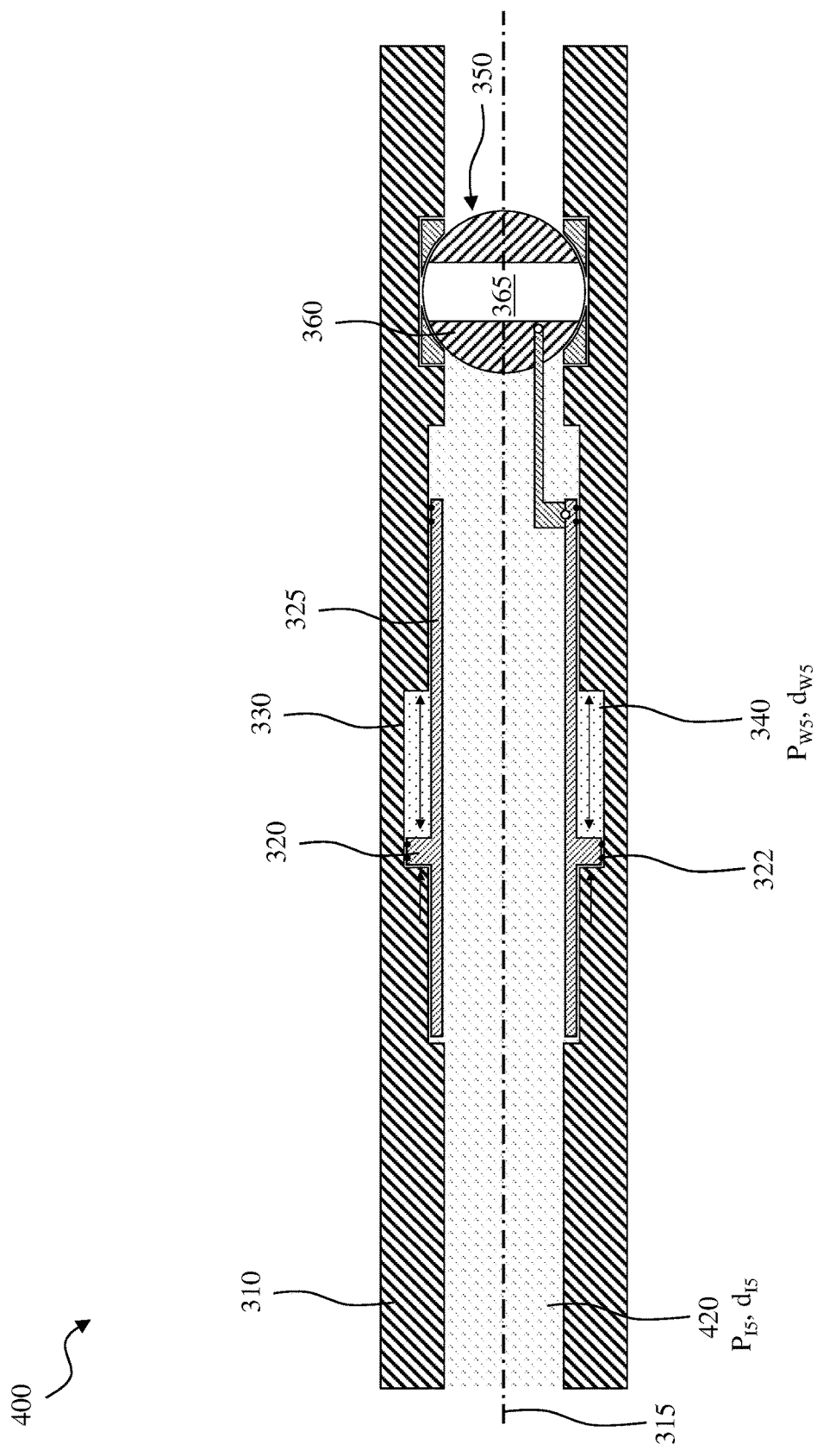

Turning to FIG. 4F, illustrated is the flow control valve 400 of FIG. 4E after decreasing the injection pressure of the injection fluid 420. In the illustrated embodiment of FIG. 4F, the injection fluid has 420 has an injection fluid pressure ($P_{I5}$) and an injection fluid density ($d_{I5}$), and the working fluid 340 has a working fluid pressure ($P_{W5}$) and a working fluid density ($d_{W5}$). In one example embodiment, the injection fluid pressure ($P_{I5}$) and injection fluid density ($d_{I5}$) might be 1000 psi and 125 kg/m³, respectively, and the working fluid pressure ($P_{W5}$) and a working fluid density ($d_{W5}$) might be 1200 psi and 150 kg/m³, respectively, again at a typical wellbore temperature of 200 degrees Fahrenheit. In this state, a volume of the sealed working fluid chamber 330 is back to 100 percent of the sealed working fluid chamber 330 of FIG. 4C. As shown in FIG. 4F, the valve assembly 350 is now positioned back in its closed position.

It should be noted that in one or more embodiments, a pressure in the working fluid is coupled to an injection fluid pressure on an interior of the tubing. Similarly, in one or more embodiments, a temperature of the working fluid may be coupled with an injection fluid temperature.

Figure 5:
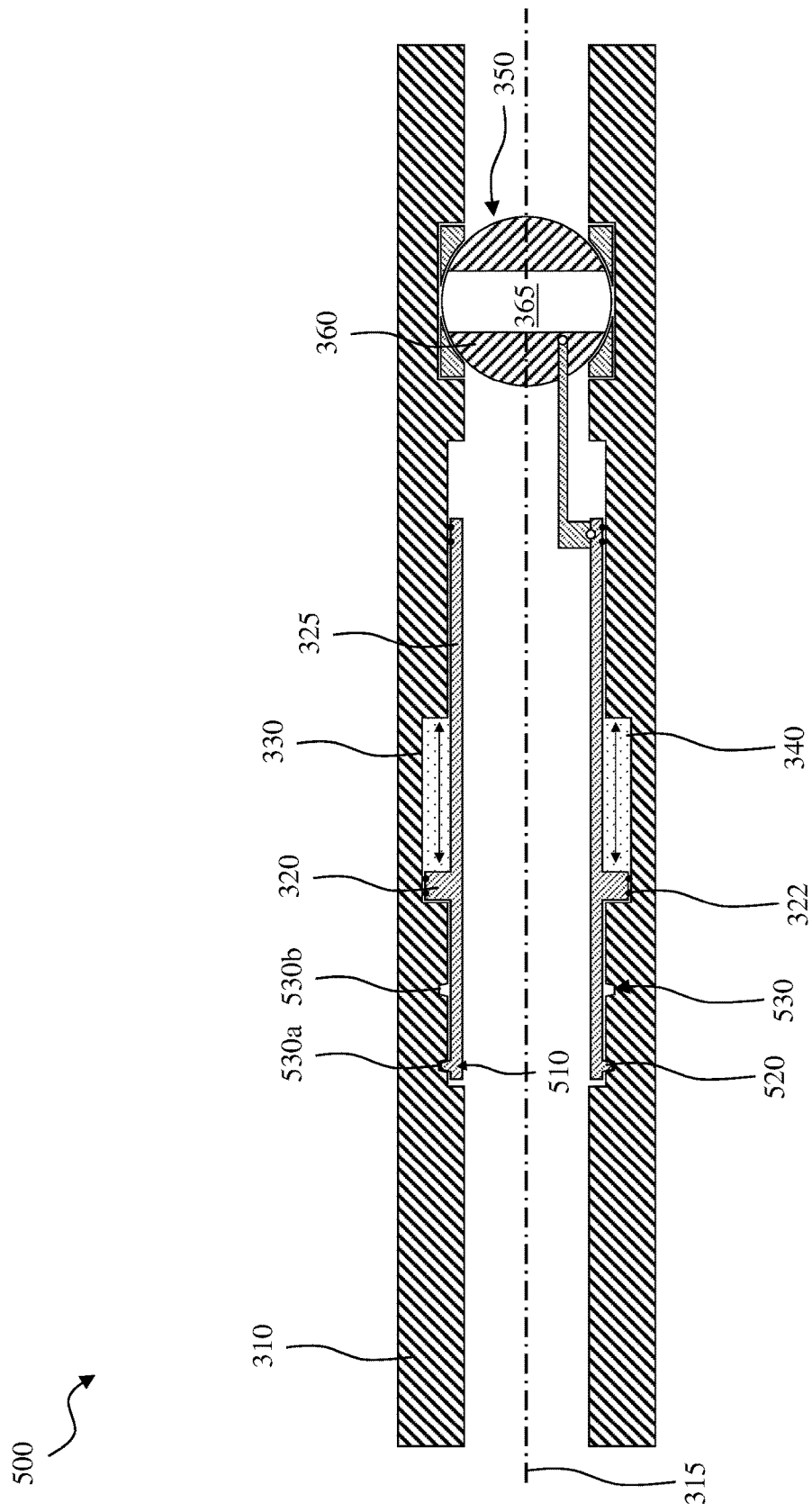
FIG. 5 illustrates a cross-sectional view of a flow control valve designed, manufactured and/or operated according to one or more alternative embodiments of the disclosure.

Turning to FIG. 5, illustrated is a cross-sectional view of a flow control valve 500 designed, manufactured and/or operated according to one or more alternative embodiments of the disclosure. The flow control valve 500 of FIG. 5 is similar in many respects to the flow control valve 300 of FIG. 3. Accordingly, like reference numbers have been used to indicate similar, if not identical, features. The flow control valve 500 of FIG. 5 differs, for the most part, from the flow control valve 300 of FIG. 3, in that the flow control valve 500 includes a retention mechanism 510, the retention mechanism 510 configured to require at least a minimum amount of force to release. The retention mechanism 510, in one or more embodiments, is configured to prevent the valve assembly 350 from getting stuck in a half open position (e.g., as shown in FIG. 4D), among other benefits.

In one or more embodiments, the retention mechanism 510 is configured to engage with the tubular 310. For example, in one or more embodiments, the retention mechanism 510 is a control arm profile 520 extending (e.g., outwardly) from the control arm 325. In this embodiment, the control arm profile 520 is configured to engage with one or more tubular profiles 530 of the tubular 310, for example to require the at least the minimum amount of force to release. In the embodiment of FIG. 5, the flow control valve 500 includes two tubular profiles 530a, 530b. In this embodiment, the retention mechanism 510 is configured to engage with the first tubular profile 530a of the tubular 310 to require at least a minimum amount of force to move the valve assembly 350 toward the open position, and is configured to engage with the second tubular profile 530b of the tubular 310 to require at least a minimum amount of force to move the valve assembly 350 toward the closed position. In the embodiment of FIG. 5, the retention mechanism 510 is a collet. Nevertheless, those skilled in the art understand the myriad of different types of retention mechanisms that could be used and remain within the scope of the disclosure.

Turning to FIGS. 6A through 6I, illustrated are different operational states of a flow control valve 600 designed, manufactured and/or operated according to one or more embodiments of the disclosure. The flow control valve 600 of FIGS. 6A through 6I is similar in many respects to the flow control valve 500 of FIG. 5. Accordingly, like reference numbers have been used to illustrate similar, if not identical, features.

Figure 6A:
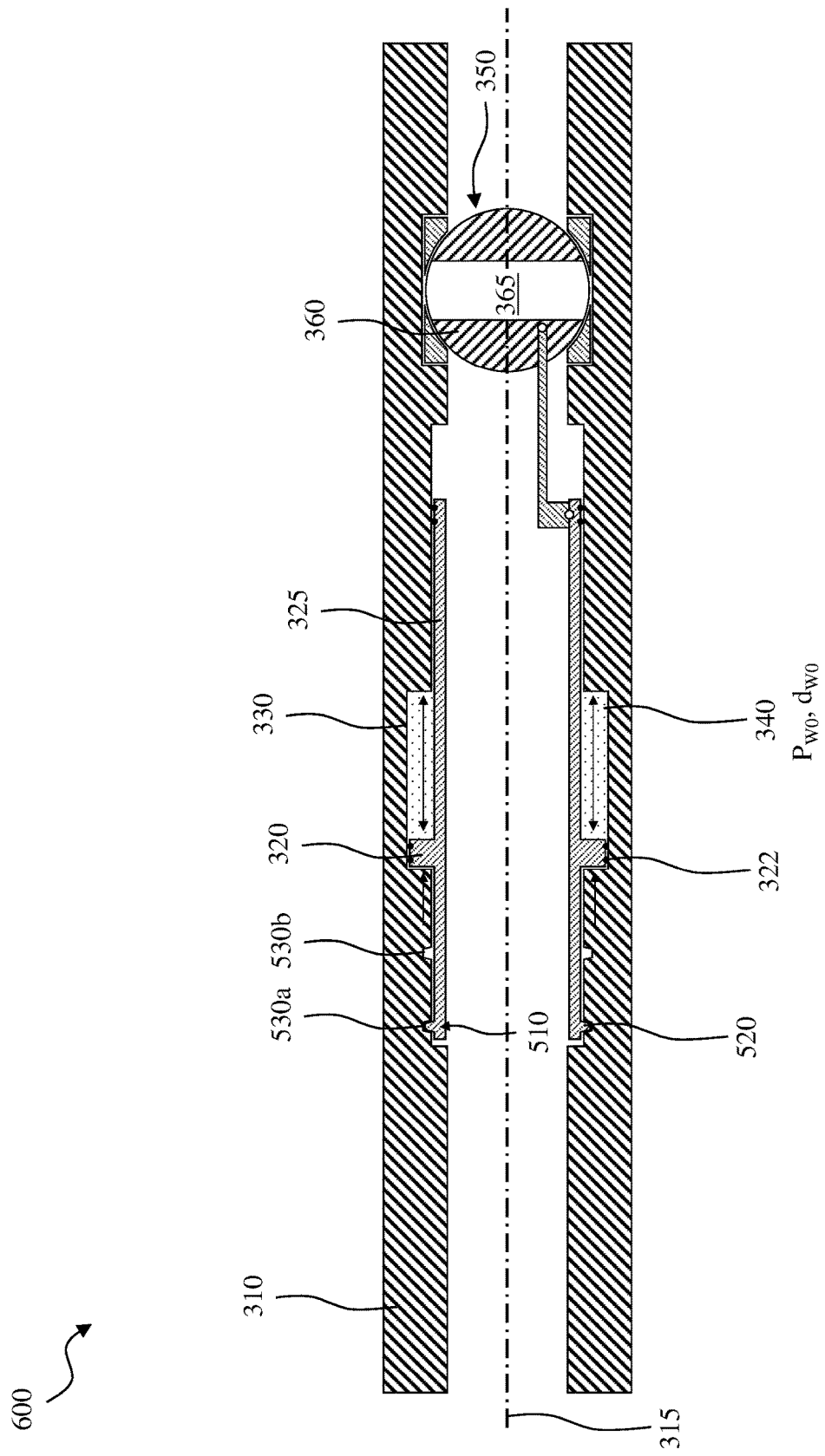
FIGS. 6A through 6I illustrate different operational states of a flow control valve designed, manufactured and/or operated according to one or more alternative embodiments of the disclosure.

With initial reference to FIG. 6A, the flow control valve 600 is illustrated in its uphole state. Accordingly, the working fluid 340 within the sealed working fluid chamber 330 (e.g., without any injection fluid within the tubular 310 and/or wellbore fluid within the tubular 310), holds the piston 320, and thus the control arm 325, toward the left (e.g., in this embodiment). Furthermore, with the piston 320 and the control arm 325 in the left most position, the valve assembly 350 is held in its closed position. In the illustrated embodiment of FIG. 6A, the working fluid 340 has a working fluid pressure ($P_{W0}$) and a working fluid density ($d_{W0}$). In one example embodiment, the working fluid pressure ($P_{W0}$) and the working fluid density ($d_{W0}$) might be 780 psi and 150 kg/m³, respectively.

Figure 6B:
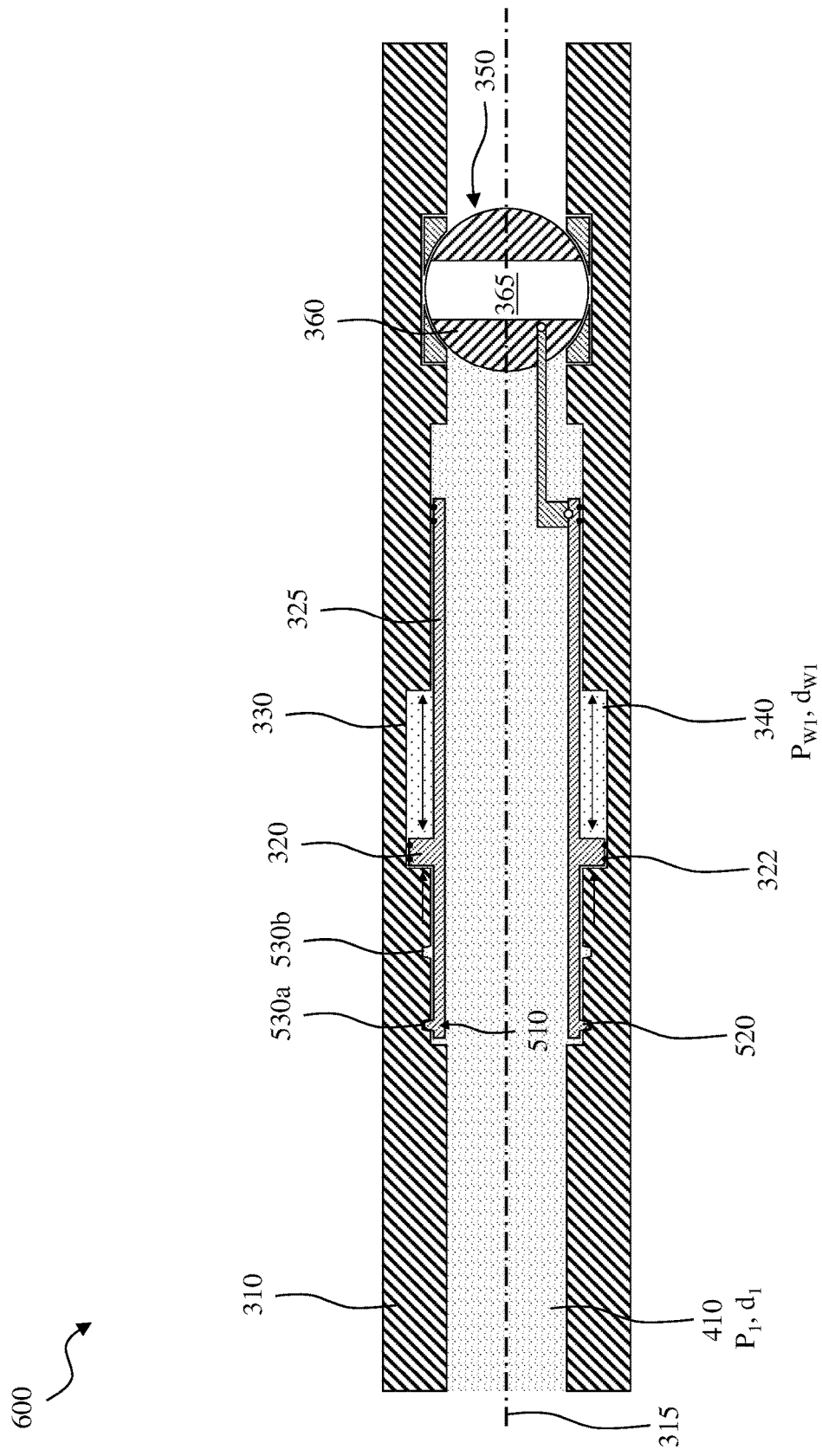

Turning to FIG. 6B, illustrated is the flow control valve 600 of FIG. 6A after positioning it within a wellbore, but before pumping injection fluid down the tubular 310 and into engagement with the piston 320. In the illustrated embodiment of FIG. 6B, wellbore fluid 410 is located within the tubular 310 and imparting pressure on an opposite side of the piston 320 as the working fluid 340. In the illustrated embodiment of FIG. 6B, the wellbore fluid has 410 has a wellbore fluid pressure ($P_1$) and a wellbore fluid density ($d_1$), and the working fluid 340 has the working fluid pressure ($P_{W1}$) and a working fluid density ($d_{W1}$). In one example embodiment, the wellbore fluid pressure ($P_1$) and a wellbore fluid density ($d_1$) might be 15 psi and 1 kg/m$^3$, respectively, and the working fluid pressure ($P_{W1}$) and working fluid density ($d_{W1}$) might be 1200 psi and 150 kg/m$^3$, respectively, for example at a typical wellbore temperature of 200 degrees Fahrenheit.

Figure 6C:
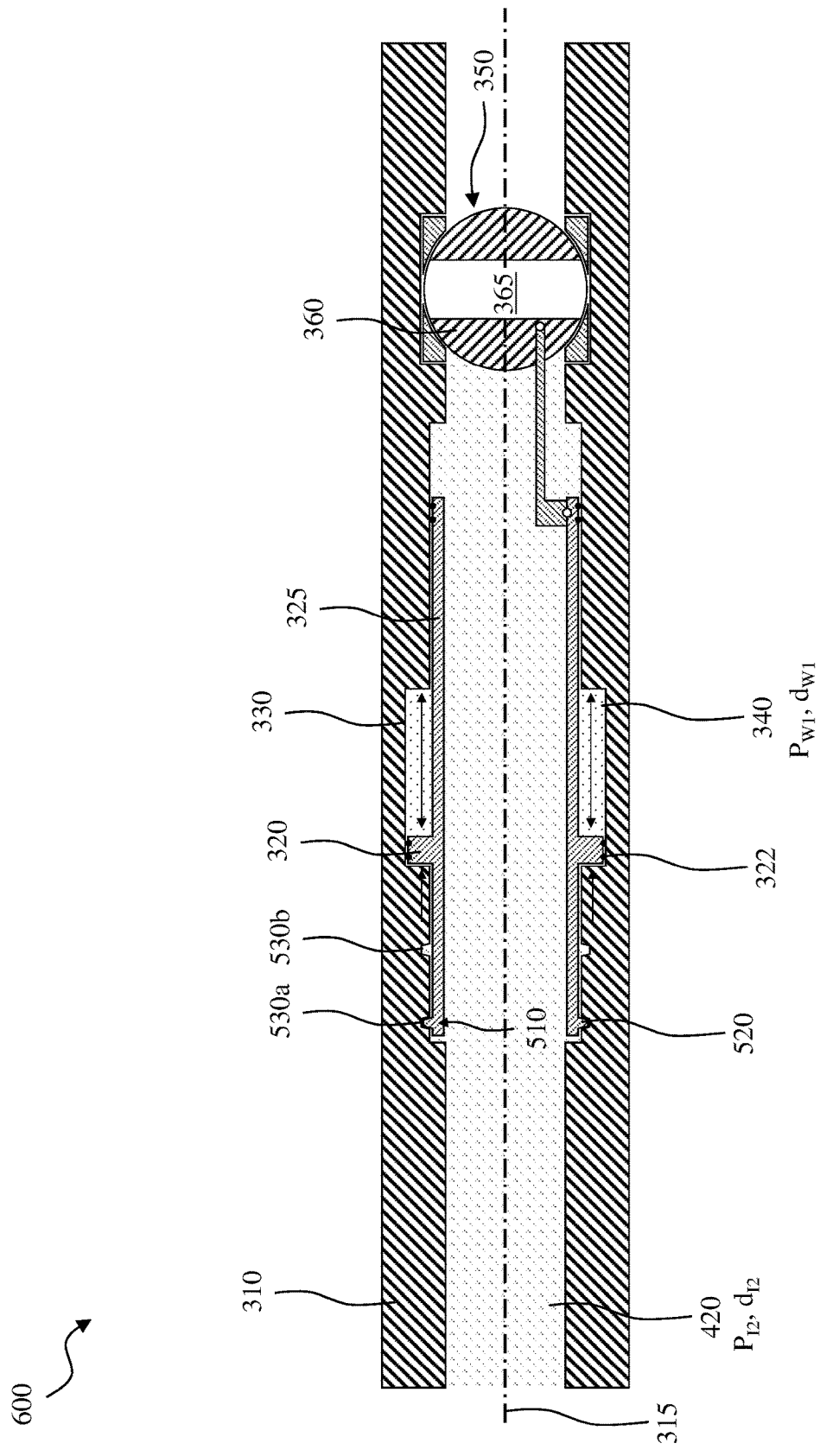

Turning to FIG. 6C, illustrated is the flow control valve 600 of FIG. 6B after pumping injection fluid 420 down the tubular 310 and into engagement with the piston 320. In the illustrated embodiment of FIG. 6C, the injection fluid has 420 has an injection fluid pressure ($P_{I2}$) and an injection fluid density ($d_{I2}$), and the working fluid 340 has the working fluid pressure ($P_{W1}$) and the working fluid density ($d_{W1}$). In one example embodiment, the injection fluid pressure ($P_{I2}$) and injection fluid density ($d_{I2}$) might be 1000 psi and 125 kg/m$^3$, respectively, and the working fluid pressure ($P_{W1}$) and a working fluid density ($d_{W1}$) might remain 1200 psi and 150 kg/m$^3$, respectively, again at a typical wellbore temperature of 200 degrees Fahrenheit. Given these example values, the piston 320 remains to the left (e.g., in the example embodiment), for example as a result of the greater values for the working fluid pressure ($P_{W1}$) and a working fluid density ($d_{W1}$) than the injection fluid pressure ($P_{I2}$) and an injection fluid density ($d_{I2}$).

Figure 6D:
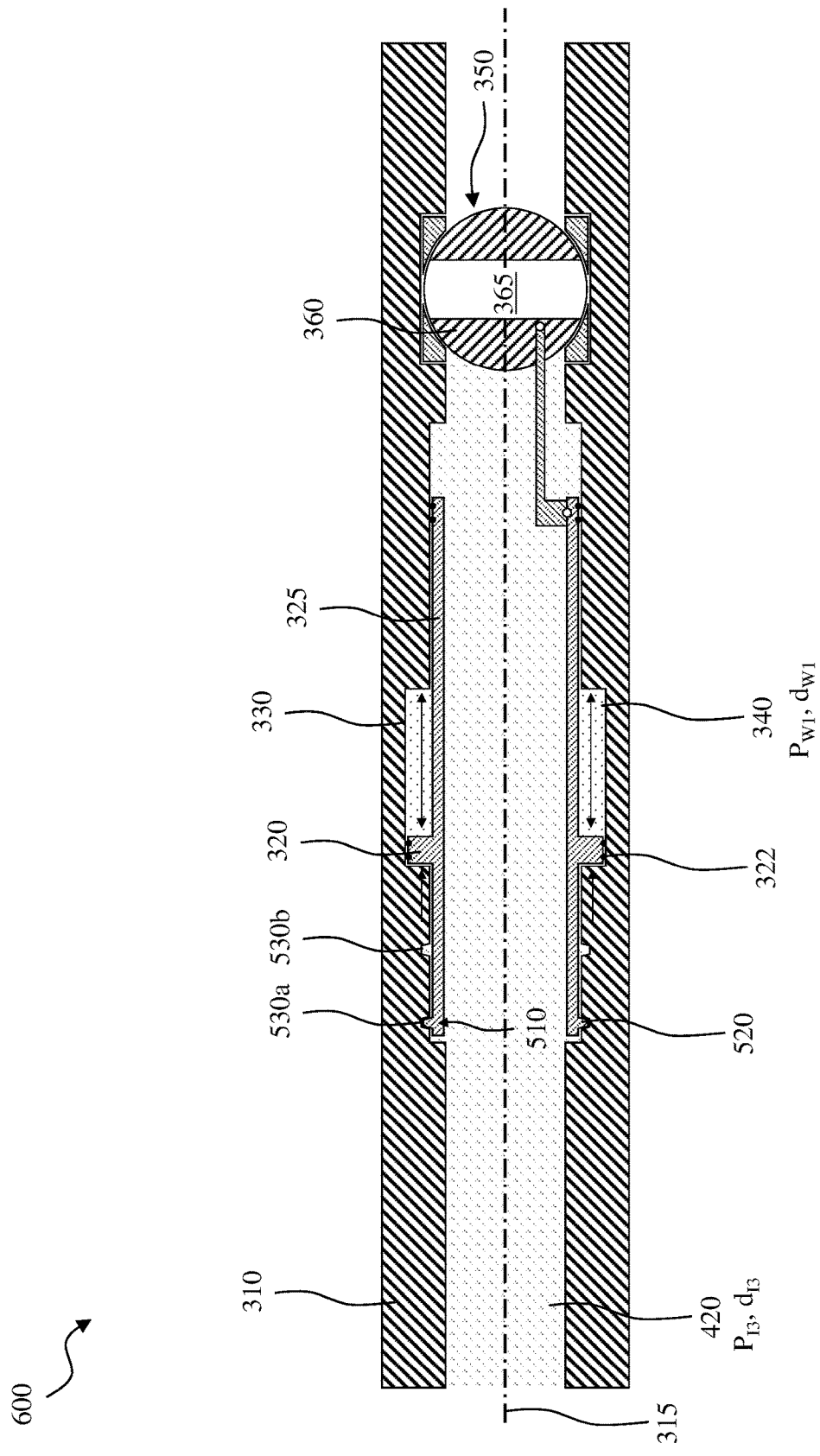

Turning to FIG. 6D, illustrated is the flow control valve 600 of FIG. 6C after starting to increase the injection pressure of the injection fluid 420. In the illustrated embodiment of FIG. 6D, the injection fluid has 420 has an injection fluid pressure ($P_{I3}$) and an injection fluid density ($d_{I3}$), and the working fluid 340 has the working fluid pressure ($P_{W1}$) and a working fluid density ($d_{W1}$). In one example embodiment, the injection fluid pressure ($P_{I3}$) and injection fluid density ($d_{I3}$) might be 1500 psi and 206 kg/m$^3$, respectively, and the working fluid pressure ($P_{W1}$) and the working fluid density ($d_{W1}$) might remain 1200 psi and 150 kg/m$^3$, respectively, again at a typical wellbore temperature of 200 degrees Fahrenheit. Typically, the difference in pressure values would push the piston 320 to the right. However, the retention mechanism 520 has the minimum amount of force (e.g., force differential across the piston 320) to move, and the difference between the injection fluid pressure ($P_{I3}$) and an injection fluid density ($d_{I3}$), and the working fluid pressure ($P_{W1}$) and a working fluid density ($d_{W1}$) is not yet enough to overcome the minimum amount of force of the retention mechanism 520.

Figure 6E:
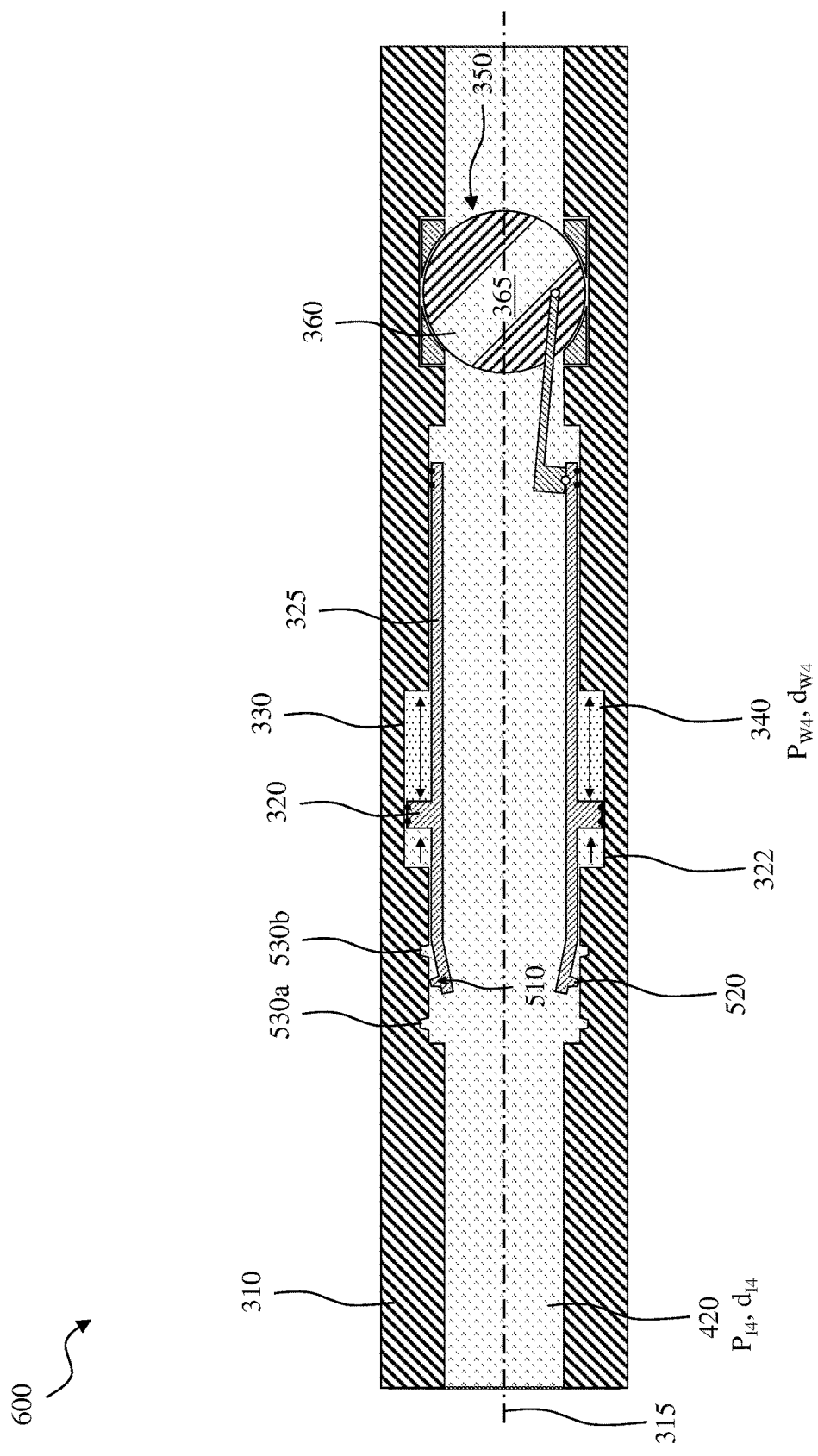

Turning to FIG. 6E, illustrated is the flow control valve 600 of FIG. 6D after continuing to increase the injection pressure of the injection fluid 420. In the illustrated embodiment of FIG. 6E, the injection fluid has 420 has an injection fluid pressure ($P_{I4}$) and an injection fluid density ($d_{I4}$), and the working fluid 340 has a working fluid pressure ($P_{W4}$) and a working fluid density ($d_{W4}$). In one example embodiment, the injection fluid pressure ($P_{I4}$) and injection fluid density ($d_{I4}$) might be 2000 psi and 300 kg/m$^3$, respectively, and the working fluid pressure ($P_{W4}$) and the working fluid density ($d_{W4}$) might be 2000 psi and 300 kg/m$^3$, respectively, again at a typical wellbore temperature of 200 degrees Fahrenheit. In this embodiment, a difference between the injection fluid pressure ($P_{I4}$) and an injection fluid density ($d_{I4}$) and the working fluid pressure ($P_{W3}$) and a working fluid density ($d_{W3}$), was enough to overcome the minimum amount of force of the retention mechanism 520, and thus the piston 320 started to move to the right. In the illustrated embodiment, the piston 320 does not stop at this midpoint, but continues to move from the state of FIG. 6E to the state of FIG. 6F in one continuous movement. In the illustrated embodiment, a pressure differential of at least 800 psi was required to overcome the amount of force of the retention mechanism. Nevertheless, the retention mechanism 510 may be designed to hold and/or release at any desirable pressure differential.

Figure 6F:
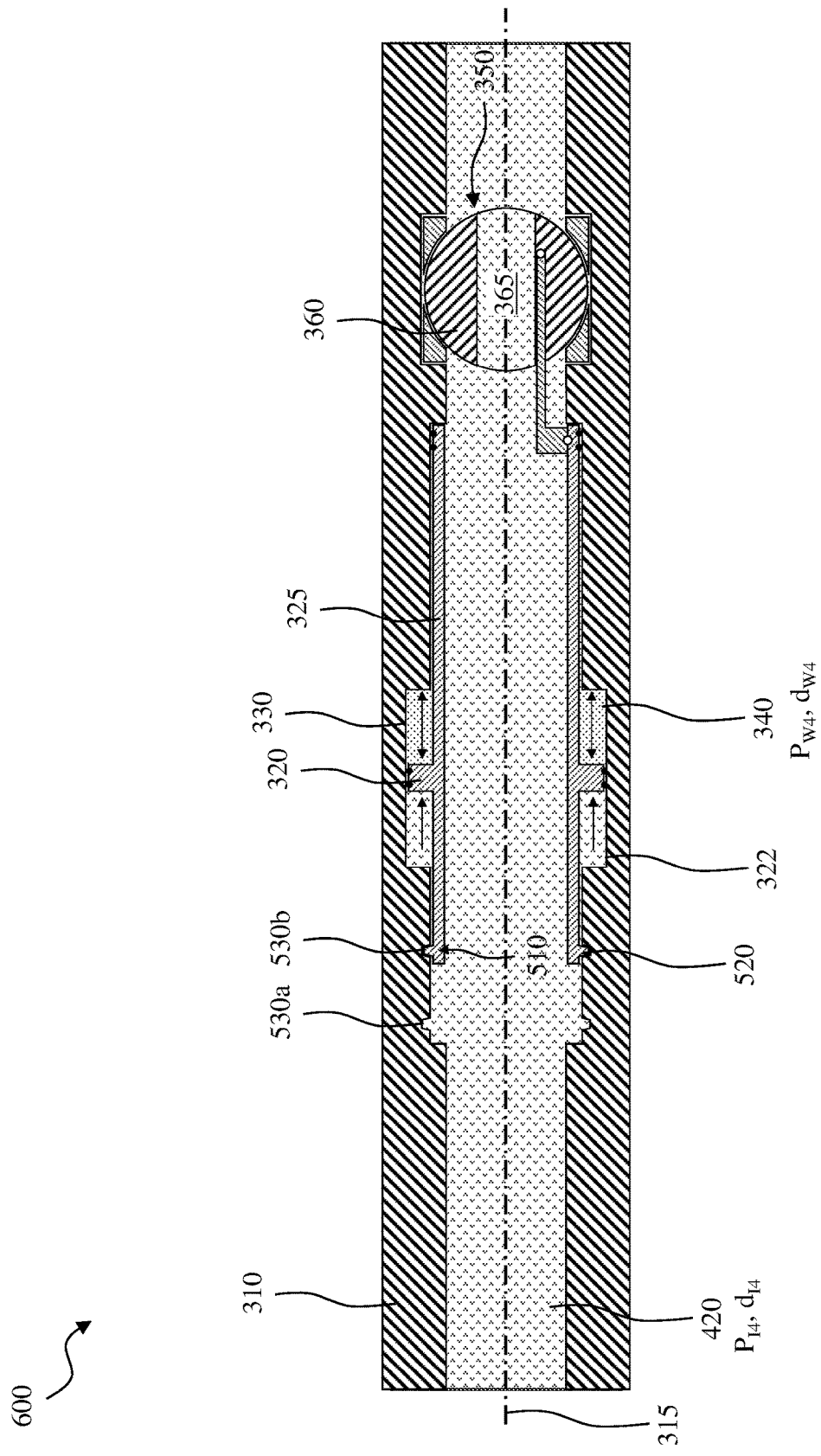

Turning to FIG. 6F, illustrated is the flow control valve 600 of FIG. 6E after the piston 320 continues to move to the right. In the illustrated embodiment of FIG. 6F, the injection fluid has 420 has the same injection fluid pressure ($P_{I4}$) and the same injection fluid density ($d_{I4}$), and the working fluid 340 has the same working fluid pressure ($P_{W4}$) and the same working fluid density ($d_{W4}$). In this state, a volume of the sealed working fluid chamber 330 is about 50 percent of the sealed working fluid chamber 330 of FIG. 6D. As shown in FIG. 6F, the valve assembly 350 is now positioned in its open position.

Figure 6G:
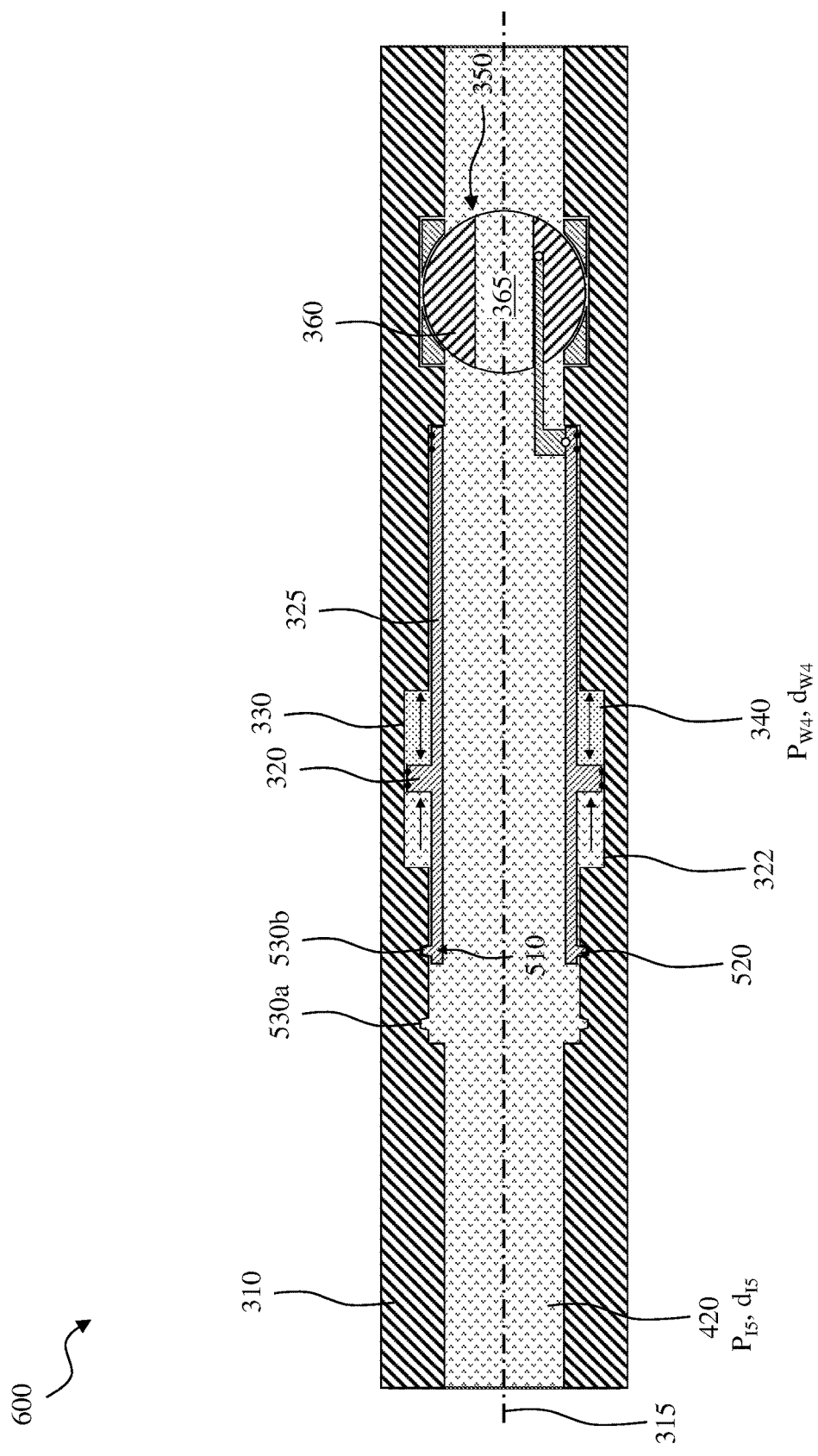

Turning to FIG. 6G, illustrated is the flow control valve 400 of FIG. 6F after decreasing the injection pressure of the injection fluid 420. In the illustrated embodiment of FIG. 6G, the injection fluid has 420 has an injection fluid pressure ($P_{I5}$) and an injection fluid density ($d_{I5}$), and the working fluid 340 has the same working fluid pressure ($P_{W4}$) and a working fluid density ($d_{W4}$). In one example embodiment, the injection fluid pressure ($P_{I5}$) and injection fluid density ($d_{I5}$) might be 1300 psi and 169 kg/m$^3$, respectively, and the working fluid pressure ($P_{W5}$) and a working fluid density ($d_{W5}$) would remain 2000 psi and 300 kg/m$^3$, respectively, again at a typical wellbore temperature of 200 degrees Fahrenheit. In this embodiment, a difference between the injection fluid pressure ($P_{I5}$) and an injection fluid density ($d_{I5}$) and the working fluid pressure ($P_{W4}$) and a working fluid density ($d_{W4}$), is not enough to overcome the minimum amount of force of the retention mechanism 520, and thus the piston 320 remains to the right.

Figure 6H:
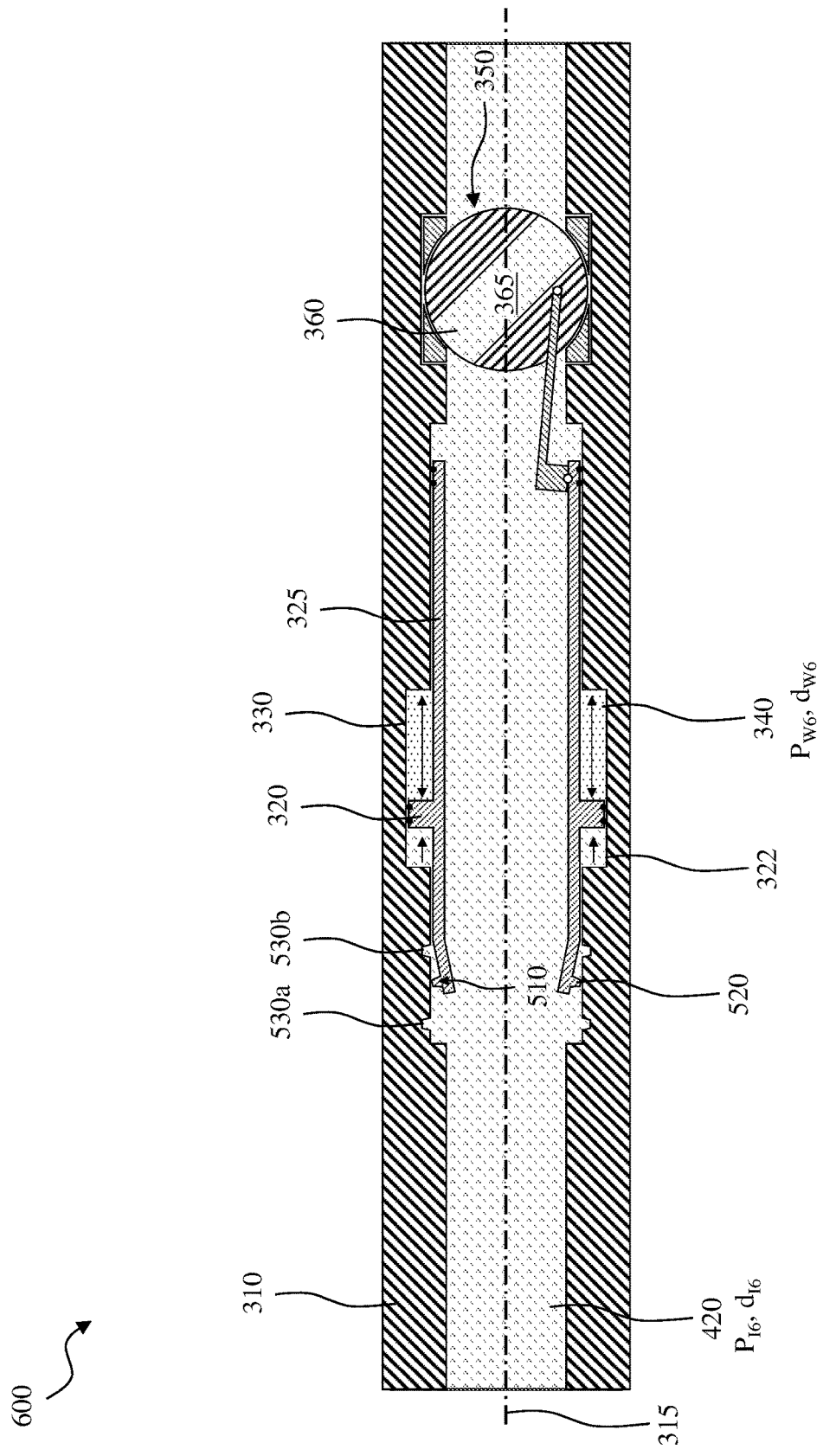

Turning to FIG. 6H, illustrated is the flow control valve 600 of FIG. 6G after continuing to decrease the injection pressure of the injection fluid 420. In the illustrated embodiment of FIG. 6H, the injection fluid has 420 has an injection fluid pressure ($P_{I6}$) and an injection fluid density ($d_{I6}$), and the working fluid 340 has a working fluid pressure ($P_{W6}$) and a working fluid density ($d_{W6}$). In one example embodiment, the injection fluid pressure ($P_{I6}$) and injection fluid density ($d_{I6}$) might be 1200 psi and 150 kg/m$^3$, respectively, and the working fluid pressure ($P_{W6}$) and the working fluid density ($d_{W6}$) might be 1200 psi and 150 kg/m$^3$, respectively, again at a typical wellbore temperature of 200 degrees Fahrenheit. In this embodiment, a difference between the injection fluid pressure ($P_{I6}$) and an injection fluid density ($d_{I6}$) and the working fluid pressure ($P_{W5}$) and a working fluid density ($d_{W5}$), was enough to overcome the minimum amount of force of the retention mechanism 520, and thus the piston 320 started to move to the left. In the illustrated embodiment, the piston 320 does not stop at this midpoint, but continues to move from the state of FIG. 6H to the state of FIG. 6I in one continuous movement.

Figure 6I:
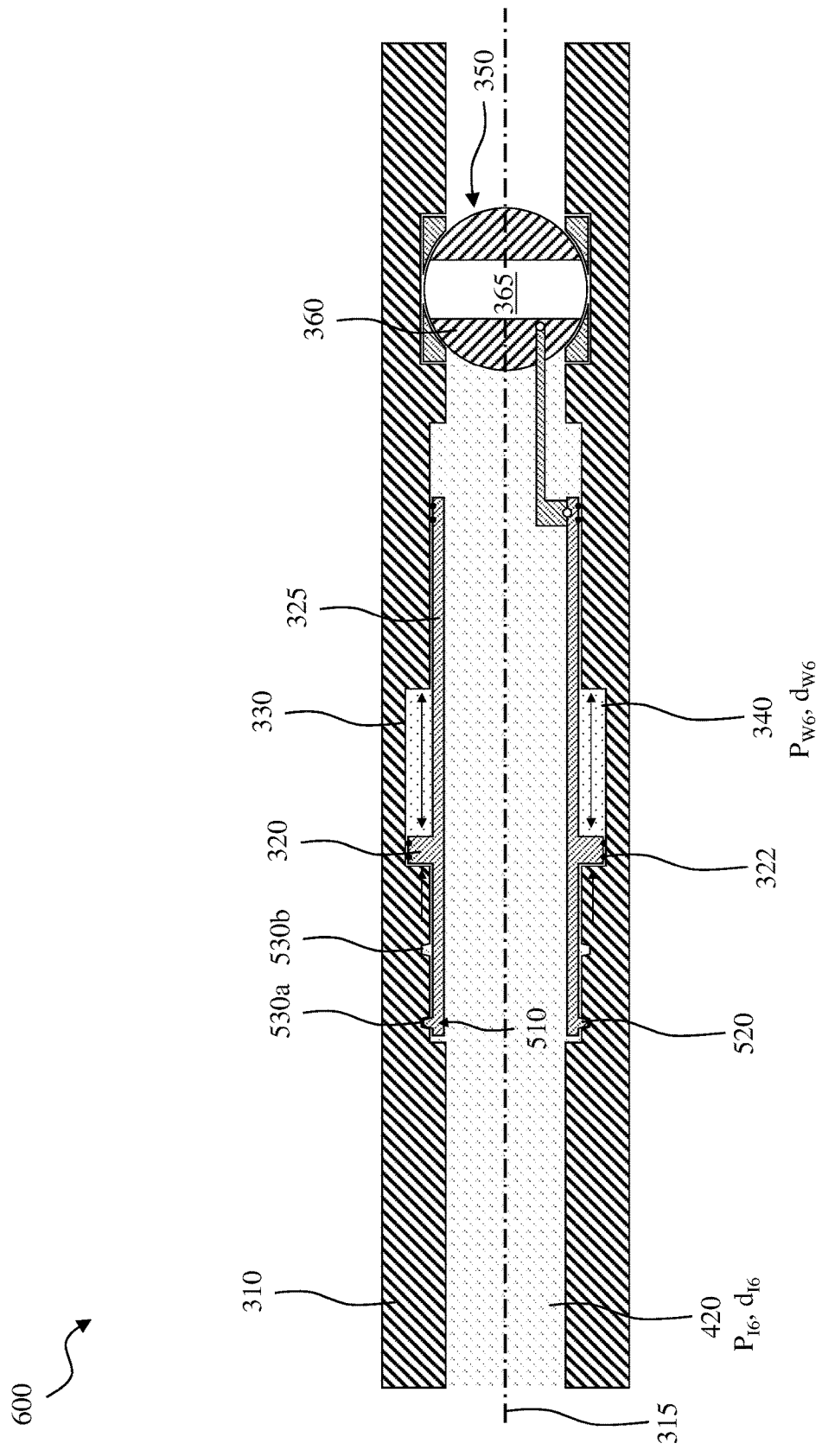

Turning to FIG. 6I, illustrated is the flow control valve 600 of FIG. 6H after the piston 320 continues to move to the left. In the illustrated embodiment of FIG. 6I, the injection fluid has 420 has the same injection fluid pressure ($P_{I6}$) and the same injection fluid density ($d_{I6}$), and the working fluid 340 has the same working fluid pressure ($P_{W6}$) and the same working fluid density ($d_{W6}$). As shown in FIG. 6I, the valve assembly 350 is now positioned back in its closed position.

The embodiment of FIGS. 6A through 6I has inherent advantages, as it is designed to toggle between full-open and full-closed, for example without a significant likelihood of remaining within a partially open/closed state. Stated another way, the design of the embodiment of FIGS. 6A through 6I is configured to not be stable in a partially open/closed state.

Those skilled in the art to which this application relates will appreciate that other and further additions, deletions, substitutions and modifications may be made to the described embodiments.

What is claimed is:

1. A flow control valve, comprising:
a tubular configured to be positioned downhole in a wellbore, the tubular having a central longitudinal axis;
a piston located in the tubular, the piston configured to separate injection fluid located within the tubular from a working fluid located in a sealed working fluid chamber;
a valve assembly located within the tubular and coupled with the piston, wherein the piston is configured to axially slide within the tubular to move the valve assembly between an open position that provides a fluid passageway for the injection fluid from the tubular into a subterranean formation and a closed position that closes the fluid passageway for the injection fluid from the tubular into the subterranean formation, based upon a density of the injection fluid.

2. The flow control valve as recited in claim 1, wherein a control arm couples the piston and the valve assembly.

3. The flow control valve as recited in claim 2, wherein the control arm forms at least a portion of a sliding sleeve.

4. The flow control valve as recited in claim 2, wherein the control arm includes a retention mechanism that is configured to engage with the tubular, the retention mechanism configured to require at least a minimum amount of force to release.

5. The flow control valve as recited in claim 4, wherein the retention mechanism is a control arm profile extending from the control arm, the control arm profile configured to engage with one or more tubular profiles to require the at least the minimum amount of force to release.

6. The flow control valve as recited in claim 4, wherein the retention mechanism is configured to engage with a first feature of the tubular to require at least a minimum amount of force to move the valve assembly toward the open position, and is configured to engage with a second feature of the tubular to require at least a minimum amount of force to move the valve assembly toward the closed position.

7. The flow control valve as recited in claim 1, wherein the valve assembly is a ball valve having a central fluid aperture, the central fluid aperture configured to be substantially parallel with the longitudinal axis when the valve assembly is in the open position and substantially transverse to the longitudinal axis when the valve assembly is in the closed position.

8. The flow control valve as recited in claim 1, wherein the working fluid is a gaseous working fluid located within the sealed working fluid chamber.

9. The flow control valve as recited in claim 8, wherein the gaseous working fluid is $CO_2$.

10. The flow control valve as recited in claim 8, wherein the gaseous working fluid is an azeotrope of $CO_2$.

11. A well system, comprising:
a wellbore extending through one or more subterranean formations;
a wellbore tubular positioned within the wellbore; and
a flow control valve coupled with the tubular, the flow control valve including:
a tubular configured to be positioned downhole in the wellbore, the tubular having a central longitudinal axis;
a piston located in the tubular, the piston configured to separate injection fluid located within the tubular from a working fluid located in a sealed working fluid chamber;
a valve assembly located within the tubular and coupled with the piston, wherein the piston is configured to axially slide within the tubular to move the valve assembly between an open position that provides a fluid passageway for the injection fluid from the tubular into a subterranean formation and a closed position that closes the fluid passageway for the injection fluid from the tubular into the subterranean formation, based upon a density of the injection fluid.

12. The well system as recited in claim 11, wherein a control arm couples the piston and the valve assembly.

13. The well system as recited in claim 12, wherein the control arm forms at least a portion of a sliding sleeve.

14. The well system as recited in claim 12, wherein the control arm includes a retention mechanism that is configured to engage with the tubular, the retention mechanism configured to require at least a minimum amount of force to release.

15. The well system as recited in claim 14, wherein the retention mechanism is a control arm profile extending from the control arm, the control arm profile configured to engage with one or more tubular profiles to require the at least the minimum amount of force to release.

16. The well system as recited in claim 14, wherein the retention mechanism is configured to engage with a first feature of the tubular to require at least a minimum amount of force to move the valve assembly toward the open position, and is configured to engage with a second feature of the tubular to require at least a minimum amount of force to move the valve assembly toward the closed position.

17. The well system as recited in claim 11, wherein the valve assembly is a ball valve having a central fluid aperture, the central fluid aperture configured to be substantially parallel with the longitudinal axis when the valve assembly is in the open position and substantially transverse to the longitudinal axis when the valve assembly is in the closed position.

18. The well system as recited in claim 11, wherein the working fluid is a gaseous working fluid located within the sealed working fluid chamber.

19. The well system as recited in claim 18, wherein the gaseous working fluid is $CO_2$.

20. The well system as recited in claim 18, wherein the gaseous working fluid is an azeotrope of $CO_2$.

21. A method, comprising:
providing injection fluid to a wellbore tubular extending downhole into a wellbore extending through a subterranean formation; and
controlling a flow of the injection fluid between the wellbore tubular and the subterranean formation using a flow control valve, the flow control valve including:
a tubular having a central longitudinal axis;

a piston located in the tubular, the piston configured to separate the injection fluid located within the tubular from a working fluid located in a sealed working fluid chamber;

a valve assembly located within the tubular and coupled with the piston, wherein the piston is configured to axially slide within the tubular to move the valve assembly between an open position that provides a fluid passageway for the injection fluid from the tubular into the subterranean formation and a closed position that closes the fluid passageway for the injection fluid from the tubular into the subterranean formation, based upon a density of the injection fluid.

\* \* \* \* \*